(12) United States Patent
Harding

(10) Patent No.: US 7,738,729 B2
(45) Date of Patent: Jun. 15, 2010

(54) SYSTEMS AND METHODS FOR REDUCING AN ARTIFACT WITHIN AN IMAGE

(75) Inventor: Geoffrey Harding, Hamburg (DE)

(73) Assignee: Morpho Detection, Inc., Newark, CA (US)

( * ) Notice: Subject to any disclaimer, the term of this patent is extended or adjusted under 35 U.S.C. 154(b) by 958 days.

(21) Appl. No.: 11/498,114

(22) Filed: Aug. 2, 2006

(65) Prior Publication Data
US 2008/0031540 A1 Feb. 7, 2008

(51) Int. Cl.
*G06K 9/40* (2006.01)
*G06K 9/00* (2006.01)
*G01N 23/06* (2006.01)
*G01N 23/04* (2006.01)
*G01N 23/20* (2006.01)

(52) U.S. Cl. .................. 382/275; 382/100; 378/51; 378/57; 378/70

(58) Field of Classification Search .................. None
See application file for complete search history.

(56) References Cited

U.S. PATENT DOCUMENTS

| | | | | |
|---|---|---|---|---|
| 3,624,397 | A * | 11/1971 | Honeycutt et al. | 250/302 |
| 4,433,380 | A * | 2/1984 | Abele et al. | 382/131 |
| 4,573,197 | A | 2/1986 | Crimmins | |
| 4,599,565 | A | 7/1986 | Hoenninger, III et al. | |
| 4,707,786 | A | 11/1987 | Dehner | |
| 4,858,128 | A | 8/1989 | Nowak | |
| 5,011,278 | A | 4/1991 | Farrell | |
| 5,253,171 | A | 10/1993 | Hsiao et al. | |
| 5,319,547 | A * | 6/1994 | Krug et al. | 705/13 |
| 5,394,342 | A | 2/1995 | Poon | |
| 5,410,400 | A | 4/1995 | Shishido et al. | |
| 5,915,034 | A | 6/1999 | Nakajima et al. | |
| 5,926,555 | A | 7/1999 | Ort et al. | |
| 5,932,513 | A * | 8/1999 | Nakamura et al. | 502/400 |
| 6,016,057 | A | 1/2000 | Ma | |
| 6,108,454 | A | 8/2000 | Nevis et al. | |
| 6,137,589 | A | 10/2000 | Obrador et al. | |
| 6,137,907 | A | 10/2000 | Clark et al. | |
| 6,542,571 | B2 | 4/2003 | Zonneveld | |
| 6,592,523 | B2 | 7/2003 | Avinash et al. | |
| 6,628,845 | B1 | 9/2003 | Stone et al. | |
| 6,681,058 | B1 | 1/2004 | Hanna et al. | |
| 6,731,824 | B2 | 5/2004 | Russell | |
| 6,788,823 | B2 | 9/2004 | Allred et al. | |
| 6,847,739 | B2 | 1/2005 | Jostschulte | |
| 6,865,301 | B1 | 3/2005 | Harris | |
| 6,873,679 | B2 | 3/2005 | Hagiwara | |

(Continued)

OTHER PUBLICATIONS

U.S. Appl. No. 11/434,431, filed May 15, 2006, Geoffrey Harding.

(Continued)

*Primary Examiner*—Tom Y Lu
*Assistant Examiner*—Thomas A Conway
(74) *Attorney, Agent, or Firm*—Armstrong Teasdale LLP

(57) ABSTRACT

A method for reducing an artifact within an image of a substance is described. The method includes generating the image of the substance, and constraining a measured linear attenuation coefficient of a pixel of the image based on at least one of a measured diffraction profile, a measured effective atomic number, and a measured packing fraction of the substance.

20 Claims, 14 Drawing Sheets

U.S. PATENT DOCUMENTS

| | | | |
|---|---|---|---|
| 6,983,078 B2 | 1/2006 | Baggs | |
| 6,988,060 B1 | 1/2006 | Coon et al. | |
| 7,023,956 B2* | 4/2006 | Heaton et al. | 378/57 |
| 7,583,779 B2* | 9/2009 | Tkaczyk et al. | 378/4 |
| 2003/0223066 A1* | 12/2003 | Lee et al. | 356/401 |
| 2006/0098866 A1* | 5/2006 | Whitson et al. | 382/162 |
| 2006/0276696 A1* | 12/2006 | Schurman et al. | 600/316 |

OTHER PUBLICATIONS

U.S. Appl. No. 11/504,263, filed Aug. 15, 2007, Geoffrey Harding.
U.S. Appl. No. 11/498,113, filed Aug. 2, 2006, Geoffrey Harding.
U.S. Appl. No. 11/484,186, filed Jul. 11, 2006, Geoffrey Harding.
U.S. Appl. No. 11/416,526, filed May 3, 2006, Geoffrey Harding et al.
U.S. Appl. No. 11/541,716, filed Sep. 29, 2006, Geoffrey Harding.
U.S. Appl. No. 11/531,019, filed Sep. 12, 2006, Geoffrey Harding.
U.S. Appl. No. 11/434,486, filed May 15, 2006, Geoffrey Harding.
U.S. Appl. No. 11/434,291, filed May 15, 2006, Geoffrey Harding.
U.S. Appl. No. 11/504,395, filed Aug. 15, 2006, Geoffrey Harding.
U.S. Appl. No. 11/531,037, filed Sep. 12, 2006, Geoffrey Harding.

Hubbell, J.H., Veigele, W.J., Briggs, E.A., Brown, R.T., Cromer, D.T., Howerton, R.J., "Atomic Form Factors, Incoherent Scattering Functions and Photon Scattering Cross-sections," Journal of Physics and Chemical Reference Data, vol. 4, No. 3, pp. 471-538 (1975).

Hubbell, J.H., Veigele, W.J., Briggs, E.A., Brown, R.T., Cromer, D.T., Howerton, R.J., "Erratum; Atomic Form Factors, Incoherent Scattering Functions, and Photon Scattering Cross Sections," Journal of Physics and Chemical Reference Data, vol. 6, pp. 615-616 (1977).

Schlomka et al., "Coherent Scatter Computer Tomography—A Novel Medical Imaging Technique," Physics of Medical Imaging, Proceedings of SPIE—vol. 5030, pp. 256-265 (2003).

Rabiej M., "Determination of the Degree of Crystallinity of Semicrystalline Polymers by Means of the 'OptiFit' Computer Software," Polimery 6, pp. 423-427 (2002).

"Percentage Crystallinity Determination by X-Ray Diffraction," XRD-6000 Application Brief, Kratos Analytical—A Shimadzu Group Company, pp. 1-5 (1999).

A.M. Hindeleh and D. J. Johnson, "The Resolution of Multipeak Data in Fibre Science," J. Phys. D: Appl. Phys., vol. 4. Printed in Great Britain, pp. 259-263 (1971).

* cited by examiner

US 7,738,729 B2

SYSTEMS AND METHODS FOR REDUCING AN ARTIFACT WITHIN AN IMAGE

BACKGROUND OF THE INVENTION

This invention relates generally to imaging systems and more particularly to systems and methods for reducing an artifact within an image.

In some computed tomography (CT) applications, an object can be scanned in a limited angular range. For example, the object may be long and rectangular such that there is too much attenuation for x-ray beams at large oblique incidence angles, or the object might be obstructed in some angular range. As another example, in electron microscopy, biological specimens in the form of thin slices can be scanned by electrons in a limited angular range because of strong attenuation of an electron beam at large oblique incidence angles.

There are many methods for reconstructing images from a plurality of projections. One of these methods is a Fourier method, which involves a transformation of projection data generated from the projections into a Fourier or frequency space. A plurality of points in the Fourier space for which there is no projection data are estimated by interpolation. The reconstruction is then obtained from the Fourier space by taking an inverse Fourier transform. From limited angle projection data generated by scanning the object in the limited angular range, one can calculate a plurality of frequency components in the limited angular range in the frequency space. A region in the frequency space where the frequency components of the object are known is an allowed sector and where a plurality of frequency components of the object are not known as a missing sector. However, an artifact or alternatively a plurality of artifacts are generated within an image that is reconstructed from the missing sector and the allowed sector.

BRIEF DESCRIPTION OF THE INVENTION

In one aspect, a method for reducing an artifact within an image of a substance is described. The method includes generating the image of the substance, and constraining a measured linear attenuation coefficient of a pixel of the image based on at least one of a measured diffraction profile, a measured effective atomic number, and a measured packing fraction of the substance.

In another aspect, a processor for reducing an artifact within an image of a substance is described. The processor is configured to generate the image of the substance, and to constrain a measured linear attenuation coefficient of a pixel of the image based on at least one of a measured diffraction profile, a measured effective atomic number, and a measured packing fraction of the substance.

In yet another aspect, an imaging system for reducing an artifact within an image of a substance is described. The imaging system includes an energy source configured to generate energy, a scatter detector configured to detect a portion of the energy upon passage of the energy through the substance, and a processor. The processor is configured to generate the image of the substance, and to constrain a measured linear attenuation coefficient of a pixel of the image based on at least one of a measured diffraction profile, a measured effective atomic number, and a measured packing fraction of the substance.

DETAILED DESCRIPTION OF THE INVENTION

Figure 1:
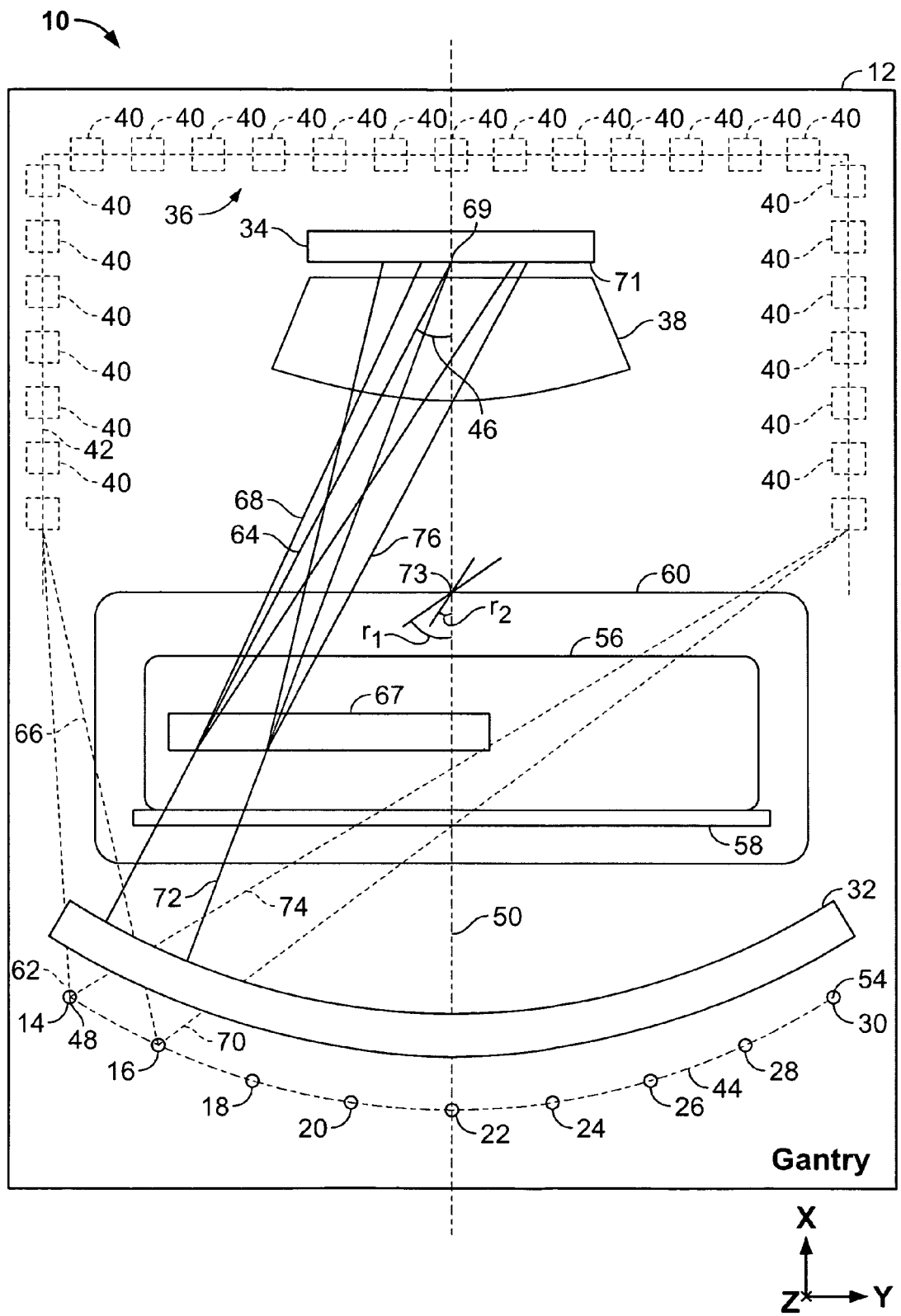
FIG. 1 shows a projection view of an embodiment of a system for reducing an artifact within an image.
Figure 2:
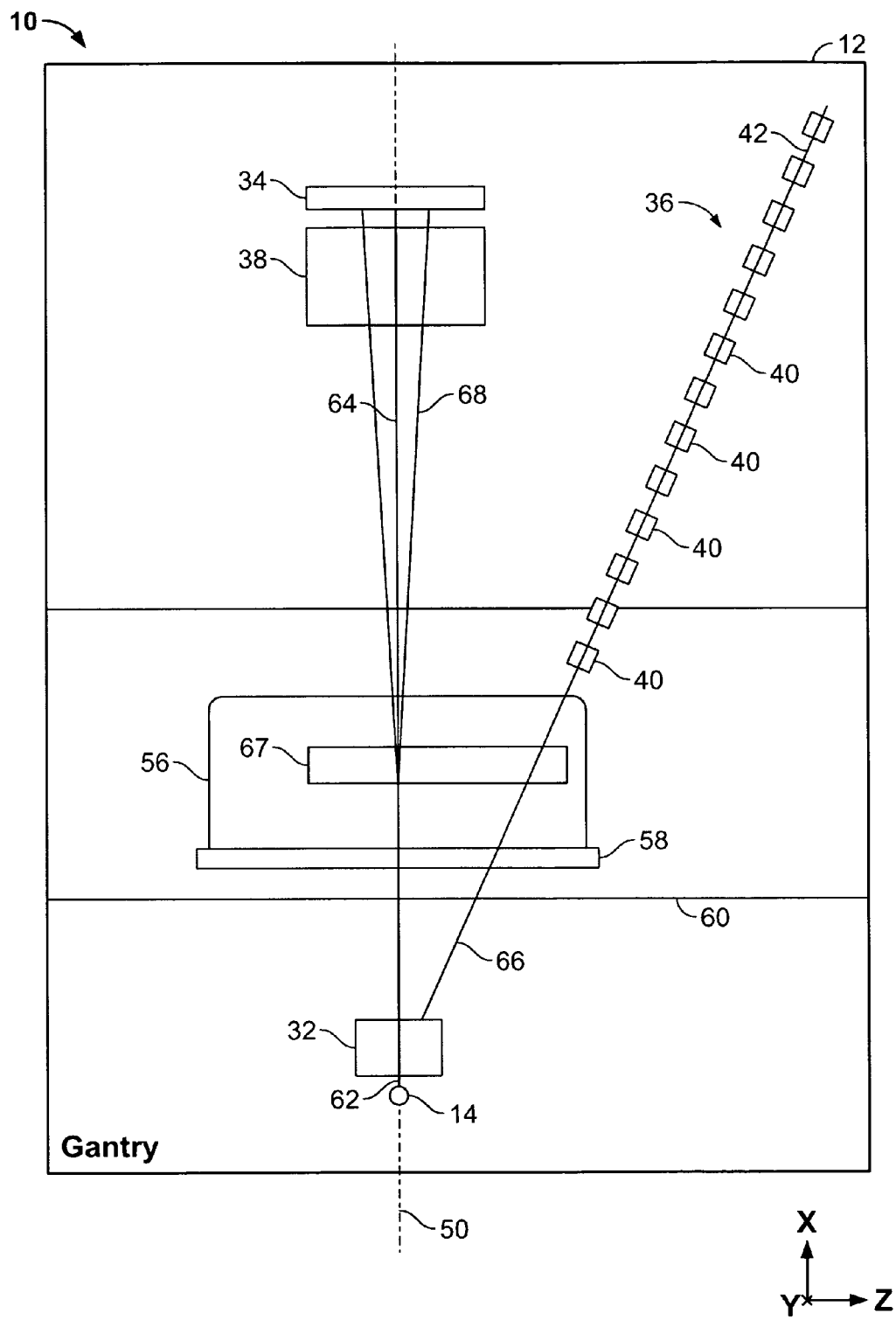
FIG. 2 is a side view of the system of FIG. 1.

FIG. 1 shows a projection view of an embodiment of a system 10 for reducing an artifact within an image and FIG. 2 is a side view of system 10. System 10 includes a gantry 12. System 10 includes a limited angle computed tomography (CT) system. Gantry 12 includes a plurality of x-ray sources 14, 16, 18, 20, 22, 24, 26, 28, and 30, a primary collimator 32, a scatter detector 34, such as a coherent scatter detector, a transmission detector 36, and a secondary collimator 38. Scatter detector 34 is a segmented semiconductor detector. An example of scatter detector 34 includes a segmented detector fabricated from Germanium. Another example of scatter detector 34 includes a scatter detector fabricated from Cadmium Telluride. Each x-ray source 14, 16, 18, 20, 22, 24, 26, 28, and 30 is an x-ray source that includes a cathode and an anode. Alternatively, each x-ray source 14, 16, 18, 20, 22, 24, 26, 28, and 30 is an x-ray source that includes a cathode and all x-ray sources 14, 16, 18, 20, 22, 24, 26, 28, and 30 share a common anode.

Transmission detector 36 includes a plurality of detector elements or detector cells 40. Although transmission detector 36 has a U-shape, alternatively, transmission detector 36 can be curved or circular in shape. Transmission detector 36 is located along and coincident with a form 42 that is U-shaped. Scatter detector 34 includes a plurality of scatter detector cells or scatter detector elements for detecting coherent scatter. Scatter detector 34 includes any number, such as, ranging from and including 5 to 1200, of scatter detector elements. For example, scatter detector 34 includes a number, such as ranging from and including 5 to 40, of scatter detector elements in a z-direction parallel to a z-axis, and a number, such as ranging from and including 1 to 30, of scatter detector elements in a y-direction parallel to a y-axis. An x-axis, the y-axis, and the z-axis are located within an xyz co-ordinate system. The x-axis is perpendicular to the y-axis and the z-axis, and the y-axis is perpendicular to the z-axis, and the x-axis is parallel to an x-direction.

Transmission detector 36 is located in a plane separate from an xy plane formed by the x-axis and the y-axis. Scatter detector 34 is located in an xy plane. Transmission detector 36 is not located in one xy plane and is located in a plane forming a transmission angle, such as from and including 15 degrees to 25 degrees, with an xy plane of scatter detector 34. The transmission angle excludes angles of zero degrees and 180 degrees with respect to an xy plane of scatter detector 34.

X-ray sources 14, 16, 18, 20, 22, 24, 26, 28, and 30 are located parallel to and coincident with an arc 44. Arc 44 extends from x-ray source 14 to x-ray source 30. It is noted that in an alternative embodiment, system 10 includes a higher number, such as 10 or 20, or alternatively a lower number, such as 4 or 6, of x-ray sources coincident with arc 44 than that shown in FIG. 1. X-ray sources, of system 10, including x-ray sources 14, 16, 18, 20, 22, 24, 26, 28, and 30, and transmission detector 36 form an inverse single-pass multi-focus imaging system. X-ray sources, of system 10, including x-ray sources 14, 16, 18, 20, 22, 24, 26, 28, and 30, have an inverse fan-beam geometry that includes a symmetric location of the x-ray sources relative to the z-axis.

A center of scatter detector 34 is located at a center of circle having arc 44. An angle 46 formed between a line connecting x-ray source 14 at an edge 48 of arc 44 and a vertical axis 50 passing through a center 69 of a bottom surface 71 of scatter detector 34 and through a center of arc 44 ranges from and including 10 degrees to 50 degrees. Moreover, an angle formed between vertical axis 50 and a line connecting x-ray source 30 at an edge 54 of arc 44 and center 69 ranges from and including 10 degrees to 50 degrees. Edge 48 is located at a first end of arc 44, the first end is opposite to a second end, and edge 54 is located at the second end.

A complete scan can be performed by a CT system, other than system 10, at a plurality of angles within a first range ranging from and including an angle of ninety degrees measured counterclockwise from vertical axis 50 to a sum of an angle of ninety degrees measured clockwise from vertical axis 50 and a fan beam angle, and the complete scan is used to acquire a complete set of projection data. The complete set of projection data is used to reconstruct an image with a number of artifacts that is less than a number of artifacts visible within an image reconstructed from projection data acquired by scanning at a plurality of angles having a second range less than the first range. In an alternative embodiment, a scan performed by the CT system at a plurality of angles from zero degrees to 360 degrees is used to acquire a complete set of projection data utilized to reconstruct an image with a number of artifacts that is less than a number of artifacts visible within an image reconstructed from projection data acquired by scanning at a plurality of angles having the second range less than the first range.

A container 56 is placed on a support 58 between x-ray sources 14, 16, 18, 20, 22, 24, 26, 28, and 30 and scatter detector 34. Container 56 and support 58 are located within an opening 60 of gantry 12. Examples of container 56 include a bag, a box, and an air cargo container. Examples of each x-ray source 14, 16, 18, 20, 22, 24, 26, 28, and 30 include a polychromatic x-ray source. Container 56 includes an unknown substance 67. Examples of unknown substance 67 include an organic explosive, an amorphous substance having a crystallinity of less than twenty five percent, a quasi-amorphous substance having a crystallinity at least equal to twenty-five percent and less than fifty percent, and a partially crystalline substance having a crystallinity at least equal to fifty percent and less than one-hundred percent. Examples of the amorphous, quasi-amorphous, and partially crystalline substances include a gel explosive, a slurry explosive, an explosive including ammonium nitrate, and a special nuclear material. Examples of the special nuclear material include plutonium and uranium. Examples of support 58 include a table and a conveyor belt.

When x-ray source 14 is activated, x-ray source 14 emits an x-ray beam 62 in an energy range, which is dependent on a voltage applied by a power source to x-ray source 14. Upon receiving x-ray beam 62, primary collimator 32 transmits, in an xy plane, a primary beam 64, which is a pencil beam, focused towards center 69. Upon receiving x-ray beam 62, a half of primary collimator 32 outputs, at an angle with respect to an xy plane, a collimated beam 66, which is a fan beam, focused towards a plane of transmission detector 36. Primary beam 64 and collimated beam 66 pass through unknown substance 67 within container 56 arranged on support 58 to output scattered radiation 68. Collimated beam 66 is focused towards a plane of transmission detector 36 and primary beam 64 is focused towards center 69. Primary beam 64 is generated in an xy plane.

A first projection angle $\gamma_1$ is formed by activating x-ray source 14 located at edge 48 of arc 44. The first projection angle $\gamma_1$ is formed between vertical axis 50 and a line connecting x-ray source 14 to a point 73. Point 73 is formed by vertically extending a line from point 69 in a negative x direction, which is vertically downward or in a direction opposite the a direction of the x-axis, to intersect opening 60. Similarly, a last projection angle $\gamma_9$ is formed by activating x-ray source 30 at edge 54 of arc 44. The last projection angle $\gamma_9$ is formed between vertical axis 50 and a line connecting x-ray source 30 to point 73.

When x-ray source 16 is activated, x-ray source 16 emits an x-ray beam 70 in an energy range, which is dependent on a voltage applied by a power source to x-ray source 16. X-ray source 16 is activated sequentially and not simultaneously with respect to x-ray source 14. Upon collimating x-ray beam 70, primary collimator 32 outputs a primary beam 72, which is a pencil beam, focused towards scatter detector 34 and a collimated beam 74, which is a fan beam, focused towards transmission detector 36. Primary beam 72 and collimated beam 74 pass through unknown substance 67 within container 56 arranged on support 58 to output scattered radiation 76. A second projection angle $\gamma_2$ is formed by activating x-ray source 16. The second projection angle $\gamma_2$ is formed between vertical axis 50 and a line connecting x-ray source 16 to point 73. A linear attenuation coefficient $\mu_A$ of unknown substance 67 is unknown before scanning unknown substance 67 and before generating an x-ray image of unknown substance 67 from the scan.

Similarly, remaining x-ray sources 18, 20, 22, 24, 26, 28, and 30 are sequentially activated. For example, x-ray source 18 is activated after and not simultaneously with x-ray source 16. As another example, x-ray source 20 is activated after and not simultaneously with x-ray source 16. When all x-ray sources 14, 16, 18, 20, 22, 24, 26, 28, and 30 coincident with arc 44 are sequentially activated, a scan of container 56 is completed. In an alternative embodiment, x-ray sources 14, 16, 18, 20, 22, 24, 26, 28, and 30 are sequentially activated from right-to-left or counterclockwise in FIG. 1. For example, x-ray source 26 is activated sequentially after and not simultaneously with x-ray source 28. As another example, x-ray source 24 is activated sequentially after and not simultaneously with x-ray source 26. A plurality of projection angle values $\gamma_1$-$\gamma_9$ are formed by respective lines joining point 73 with respective x-ray sources 14, 16, 18, 20, 22, 24, 26, 28, and 30 that are activated. A scan performed at the projection angle values $\gamma_1$-$\gamma_9$ is not the complete scan. For example, the projection angle values $\gamma_1$-$\gamma_9$ are included within an angle or an angle variable $\gamma$ ranging from and including 0 degrees to 40 degrees counterclockwise with respect to vertical axis 50 and ranging from and including 0 degrees to 40 degrees clockwise with respect to vertical axis 50.

Secondary collimator 38 is located between support 58 and scatter detector 34. Secondary collimator 38 includes a number of collimator elements, such as sheets, slits, or laminations, to ensure that scattered radiation arriving at scatter detector 34 has a constant scatter angle with respect to a primary beam intersecting unknown substance 67 to output the scattered radiation and to ensure that a position of scatter detector 34 permits a depth in container 56 at which the scattered radiation originated to be determined. For example, the collimator elements of secondary collimator 38 are arranged parallel to directions of scattered radiation 68 to absorb scattered radiation that is not parallel to the directions of the scattered radiation 68.

The number of collimator elements in secondary collimator 38 provided is equal to or alternatively greater than a number of scatter detector elements of scatter detector 34 and the collimator elements are arranged such that scattered radiation between neighboring collimator elements is incident on one of the scatter detector elements. The collimator elements of secondary collimator 38 are made of a radiation-absorbing material, such as, steel, copper, silver, or tungsten.

Above support 58 and in a plane at an angle relative to an xy plane, there is arranged transmission detector 36, which measures a plurality of intensities of a plurality of collimated beams, such as collimated beams 66 and 74, generated from a plurality of x-ray beams output by sequentially activating x-ray sources 14, 16, 18, 20, 22, 24, 26, 28, and 30 once either clockwise or counterclockwise. Transmission detector 36 measures a plurality of intensities when x-ray sources 14, 16, 18, 20, 22, 24, 26, 28, and 30 are sequentially activated either clockwise or counterclockwise to generate a plurality of transmission electrical output signals. Moreover, above support 58, there is arranged scatter detector 34 that measures photon energies of scattered radiation, including scattered radiation 68 and a portion of scattered radiation 76, that is received by scatter detector 34 and that is generated from a plurality of x-ray beams output by sequentially activating x-ray sources 14, 16, 18, 20, 22, 24, 26, 28, and 30 once either clockwise or counterclockwise. Each scatter detector element measures the x-ray photons within scattered radiation received by the scatter detector element in an energy-sensitive manner by outputting a plurality of scatter electrical output signals linearly dependent on a plurality of energies of the x-ray photons detected from within the scattered radiation.

Scatter detector 34 detects scattered radiation that is generated from a plurality of x-ray beams output by sequentially activating x-ray sources 14, 16, 18, 20, 22, 24, 26, 28, and 30 once either clockwise or counterclockwise and the scattered radiation is detected to generate a plurality of scatter electrical output signals. In an alternative embodiment, transmission detector 36, scatter detector 34, primary collimator 32, secondary collimator 38, and x-ray sources 14, 16, 18, 20, 22, 24, 26, 28, and 30 are located outside gantry 12.

Figure 3:
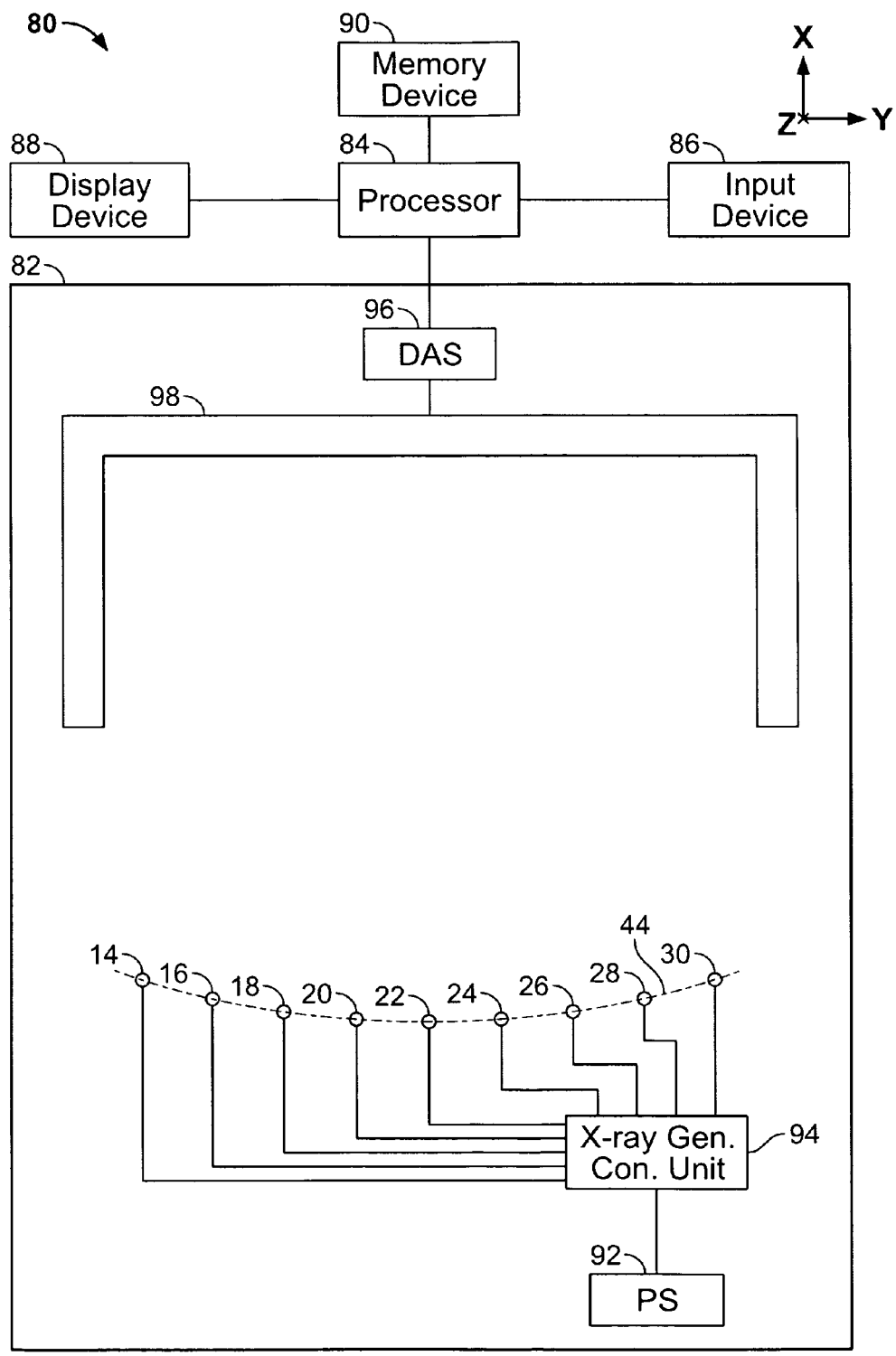
FIG. 3 is a block diagram of a front view of another embodiment of a system for reducing an artifact within an image.

FIG. 3 is a block diagram of a front view of an embodiment of a system 80 for reducing an artifact within an image. System 80 includes a gantry 82, a processor 84, an input device 86, a display device 88, and a memory device 90. As used herein, the term processor is not limited to just those integrated circuits referred to in the art as a processor, but broadly refers to a computer, a microcontroller, a microcomputer, a programmable logic controller, an application specific integrated circuit, and any other programmable circuit. The computer may include a device, such as, a floppy disk drive or CD-ROM drive, for reading data including the methods for reducing an artifact within an image from a computer-readable medium, such as a floppy disk, a compact disc—read only memory (CD-ROM), a magneto-optical disk (MOD), or a digital versatile disc (DVD). In another embodiment, processor 84 executes instructions stored in firmware. Examples of display device 88 include a liquid crystal display (LCD) and a cathode ray tube (CRT). Examples of memory device 90 include a random access memory (RAM) and a read-only memory (ROM). Examples of input device 86 include a mouse and a keyboard.

Gantry 80 is an example of gantry 12 (FIG. 1) and includes components of gantry 12. For example, gantry 80 includes opening 60 for placing container 56, secondary collimator 38, and scatter detector 34. Gantry 80 includes a power supply 92, an x-ray generation control unit 94, x-ray sources 14, 16, 18, 20, 22, 24, 26, 28, and 30, a data acquisition system (DAS) 96, and a housing 98 of transmission detector 36. Housing 98 includes detector elements 40 of transmission detector 36. Alternatively, power supply 92 is located outside gantry 80.

X-ray generation control unit 94 includes a pulse generator (not shown) that is coupled to processor 84 and that receives power from power supply 92. Power supply 92 is coupled to x-ray sources 14, 16, 18, 20, 22, 24, 26, 28, and 30 to supply power to x-ray sources 14, 16, 18, 20, 22, 24, 26, 28, and 30.

Processor 84 issues a command, such as a first on command, a second on command, a first off command, and a second off command. Upon receiving the first on command from processor 84, the pulse generator generates a pulse and transmits the pulse to x-ray source 14. Upon receiving a pulse from the pulse generator, x-ray source 14 generates x-ray beam 62 under a potential applied by power supply 92. Similarly, upon receiving the first off command signal from processor 84, the pulse generator stops transmitting a pulse to x-ray source 14 and x-ray source 14 stops generating x-ray beam 62. Furthermore, upon receiving the second on command signal from processor 84, the pulse generator generates and transmits a pulse to any one of the remaining x-ray sources 16, 18, 20, 22, 24, 26, 28, and 30 and the one of the remaining x-ray sources 16, 18, 20, 22, 24, 26, 28, and 30 generates an x-ray beam. For example, upon receiving the second on command signal from processor 84, the pulse generator generates and transmits a pulse to x-ray source 16 and x-ray source 16 generates x-ray beam 70. Upon receiving the second off command signal from processor 84, the pulse generator stops transmitting a pulse to any one of the remaining x-ray sources 16, 18, 20, 22, 24, 26, 28, and 30 and the one of the remaining x-ray sources 16, 18, 20, 22, 24, 26, 28, and 30 stops generating an x-ray beam. For example, upon receiving the second off command signal from processor 84, the pulse generator stops transmitting a pulse to x-ray source 16 and x-ray source 16 stops generating x-ray beam 70.

When a scan is conducted by sequentially activating x-ray sources 14, 16, 18, 20, 22, 24, 26, 28, and 30 once either clockwise or counterclockwise, DAS 96 samples projection data or analog data, such as the transmission electrical output signals, generated from detector elements 40 of transmission detector 36 and converts the analog data to a plurality of digital signals for subsequent processing. Processor 84 receives sampled and digitized x-ray data from DAS 96 and performs image reconstruction to generate the x-ray image, such as a CT image, of unknown substance 67. Examples of the image reconstruction include filtered back projection (FBP) and iterative reconstruction (IR). The x-ray image may be displayed on display device 88 and stored in memory device 90. The x-ray image includes a plurality of CT numbers measured in Hounsfeld units (HUs). Each pixel in the x-ray image is represented by a CT number. For example, a first pixel representing a portion of unknown substance 67 within the x-ray image has a CT number of $CT_{pixel1}$.

Processor 84 stores, within memory device 90, a first relationship between a linear attenuation coefficient $\mu_{pixel1}$ of a first material represented by the first pixel of the x-ray image of unknown substance 67 and the CT number $CT_{pixel1}$ of the first pixel. The first relationship is expressed as $$CT_{pixel1} = \frac{\mu_{pixel1} - \mu_{water}}{\mu_{water}} \times 1000 \qquad (1)$$

where $\mu_{water}$ is a linear attenuation coefficient of water. An example of the first material include a portion of unknown substance 67. Moreover, processor 84 stores, within memory device 90, a second relationship between a linear attenuation coefficient $\mu_{pixel2}$ of a second material represented by a second pixel of the x-ray image of unknown substance 67 and a CT number $CT_{pixel2}$ of the second pixel. An example of the second material includes a portion of unknown substance 67. The second relationship is expressed as $$CT_{pixel2} = \frac{\mu_{pixel2} - \mu_{water}}{\mu_{water}} \times 1000 \qquad (2)$$

Similarly, processor 84 stores, within memory device 90, a plurality of respective relationships, such as equations (1) and (2), between a plurality of respective linear attenuation coefficients of a plurality of respective materials represented by a plurality of respective remaining pixels of the x-ray image of unknown substance 67 and a plurality of respective CT numbers of the respective remaining pixels of the x-ray image of unknown substance 67.

Figure 4:
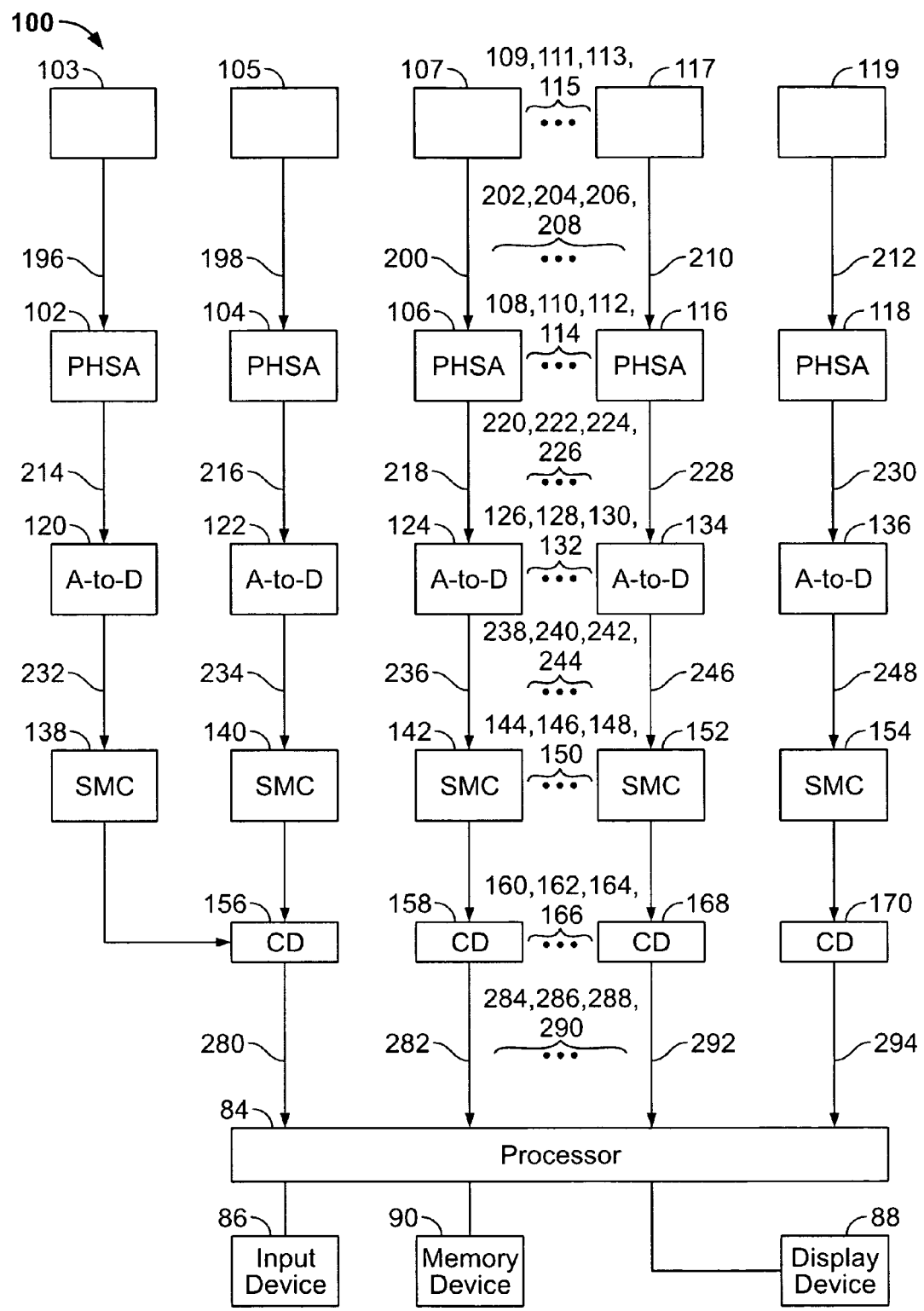
FIG. 4 is a block diagram of yet another embodiment of a system for reducing an artifact within an image.

FIG. 4 is a block diagram of an embodiment of a system 100 for reducing an artifact within an image. System 100 includes a plurality of scatter detector elements 103, 105, 107, 109, 111, 113, 115, 117, and 119 of scatter detector 34, a plurality of pulse-height shaper amplifiers (PHSA) 102, 104, 106, 108, 110, 112, 114, 116, and 118, a plurality of analog-to-digital (A-to-D) converters 120, 122, 124, 126, 128, 130, 132, 134, and 136, a plurality of spectrum memory circuits (SMCs) 138, 140, 142, 144, 146, 148, 150, 152, and 154 allowing pulse height spectra to be acquired, a plurality of correction devices (CDs) 156, 158, 160, 162, 164, 166, 168, and 170, processor 84, input device 86, display device 88, and memory device 90. An example of each of correction devices 156, 158, 160, 162, 164, 166, 168, and 170 include a divider circuit. Each of spectrum memory circuits 138, 140, 142, 144, 146, 148, 150, 152, and 154 include an adder and a memory device 90, such as a RAM or a ROM.

Scatter detector elements 103, 105, 107, 109, 111, 113, 115, 117, and 119 are coupled to pulse-height shaper amplifiers 102, 104, 106, 108, 110, 112, 114, 116, and 118, respectively. Scatter detector elements 103, 105, 107, 109, 111, 113, 115, 117, and 119 generate a plurality of scatter electrical output signals 196, 198, 200, 202, 204, 206, 208, 210, and 212 by detecting scattered radiation, such as scattered radiation 68 and 76. For example, scatter detector element 105 generates scatter electrical output signal 198 for each scattered x-ray photon incident on scatter detector element 105. Each pulse-height shaper amplifier amplifies a scatter electrical output signal received from a scatter detector element. For example, pulse-height shaper amplifier 102 amplifies scatter electrical output signal 196 and pulse-height shaper amplifier 104 amplifies scatter electrical output signal 198. Pulse-height shaper amplifiers 102, 104, 106, 108, 110, 112, 114, 116, and 118 have a gain factor determined by processor 84.

An amplitude of a scatter electrical output signal output from a scatter detector element is proportional to an integrated intensity of an x-ray quantum that is detected by the scatter detector element to generate the scatter electrical output signal. For example, an amplitude of scatter electrical output signal 196 is proportional to an integrated intensity of an x-ray quantum in scattered radiation 68 detected by scatter detector element 103. As another example, an amplitude of scatter electrical output signal 198 is proportional to an integrated intensity of an x-ray quantum within scattered radiation 76 that is detected by scatter detector element 105.

A pulse-height shaper amplifier generates an amplified output signal by amplifying a scatter electrical output signal generated from a scatter detector element. For example, pulse-height shaper amplifier 102 generates an amplified output signal 214 by amplifying scatter electrical output signal 196 and pulse-height shaper amplifier 104 generates an amplified output signal 216 by amplifying scatter electrical output signal 198. Similarly, a plurality of amplified output signals 218, 220, 222, 224, 226, 228, and 230 are generated. An analog-to-digital converter converts an amplified output signal from an analog form to a digital form to generate a digital output signal. For example, analog-to-digital converter 120 converts amplified output signal 214 from an analog form to a digital format to generate a digital output signal 232. Similarly, a plurality of digital output signals 234, 236, 238, 240, 242, 244, 246, and 248 are generated by analog-to-digital converters 122, 124, 126, 128, 130, 132, 134, and 136, respectively. A digital value of a digital output signal generated by an analog-to-digital converter represents an amplitude of energy or alternatively an amplitude of intensity of a pulse of an amplified output signal. Each pulse is generated by an x-ray quantum, such as an x-ray photon of scattered radiation. For example, a digital value of digital output signal 234 output by analog-to-digital converter 122 is a value of an amplitude of a pulse of amplified output signal 216.

An adder of a spectrum memory circuit adds a number of pulses in a digital output signal. For example, when analog-to-digital converter 122 converts a pulse of amplified output signal 216 into digital output signal 234 to determine an amplitude of the pulse of amplified output signal 216, an adder within spectrum memory circuit 140 increments, by one, a value within a memory device 90 of spectrum memory circuit 140. Accordingly, at an end of a scan of unknown substance 67 conducted by activating x-ray sources 14, 16, 18, 20, 22, 24, 26, 28, and 30 once either clockwise or counterclockwise, a memory device within a spectrum memory circuit stores a number of x-ray quanta detected by a scatter detector element. For example, a memory device within spectrum memory circuit 142 stores a number of x-ray photons detected by scatter detector element 107 and each of the x-ray photons has an amplitude of energy or alternatively an amplitude of intensity that is determined by analog-to-digital converter 124.

A correction device receives a number of x-ray quanta that have a range of energies and are stored within a memory device of one of spectrum memory circuits 140, 142, 144, 146, 148, 150, 152, and 154, and divides the number by a number of x-ray quanta having the range of energies received from a memory device of spectrum memory circuit 138. For example, correction device 156 receives a number of x-ray photons having a range of energies from a memory device of spectrum memory circuit 140, and divides the number by a number of x-ray photons having the range received from a memory device of spectrum memory circuit 138. Each correction device outputs a correction output signal that represents a range of energies within x-ray quanta received by a scatter detector element. For example, correction device 156 outputs a correction output signal 280 representing an energy spectrum or alternatively an intensity spectrum within x-ray quanta detected by scatter detector element 105. As another example, correction device 158 outputs correction output signal 282 representing an energy spectrum within x-ray quanta detected by scatter detector element 107. Similarly, a plurality of correction output signals 284, 286, 288, 290, 292, and 294 are generated by correction devices 160, 162, 164, 166, 168, and 170, respectively.

Processor 84 receives a plurality of correction output signals 280, 282, 284, 286, 288, 290, 292, and 294 generated upon sequentially activating x-ray sources 14, 16, 18, 20, 22, 24, 26, 28, and 30 once either clockwise or counterclockwise. Processor 84 receives correction output signals 280, 282, 284, 286, 288, 290, 292, and 294 generated upon sequentially activating x-ray sources 14, 16, 18, 20, 22, 24, 26, 28, and 30 once either clockwise or counterclockwise to generate a momentum transfer $x_A$, measured in inverse nanometers ($nm^{-1}$), from an energy spectrum $r(E_A)$ of energy $E_A$ of x-ray quanta within scattered radiation that is generated by unknown substance 67 and that is detected by scatter detector 34. Processor 84 generates the momentum transfer $x_A$ by applying $$x_A = (E_A/hc)\sin(\eta/2) \quad (3)$$

where c is a speed of light, h is Planck's constant, $\eta$ represents constant scatter angles of x-ray quanta of scattered radiation detected by the scatter detector 34. Processor 84 relates the energy $E_A$ to the momentum transfer $x_A$ by equation (3). Mechanical dimensions of the secondary collimator 38 define the scatter angle $\eta$. The secondary collimator 38 restricts scatter radiation that does not have the scatter angle $\eta$ from being received by scatter detector 34. Processor 84 receives the scatter angle $\eta$ from a user, such as a human being, via input device 86.

It is noted that a number of pulse-height shaper amplifiers 102, 104, 106, 108, 110, 112, 114, 116, and 118 changes with a number of scatter detector elements 103, 105, 107, 109, 111, 113, 115, 117, and 119. For example, five pulse-height shaper amplifiers are used for amplifying signals received from five scatter detector elements. As another example, four pulse-height shaper amplifiers are used for amplifying signals received from four scatter detector elements. Similarly, a number of analog-to-digital converters 120, 122, 124, 126, 128, 130, 132, 134, and 136 changes with a number of scatter detector elements 103, 105, 107, 109, 111, 113, 115, 117, and 119 and a number of spectrum memory circuits 138, 140, 142, 144, 146, 148, 150, 152, and 154 changes with the number of scatter detector elements 103, 105, 107, 109, 111, 113, 115, 117, and 119.

Figure 5:
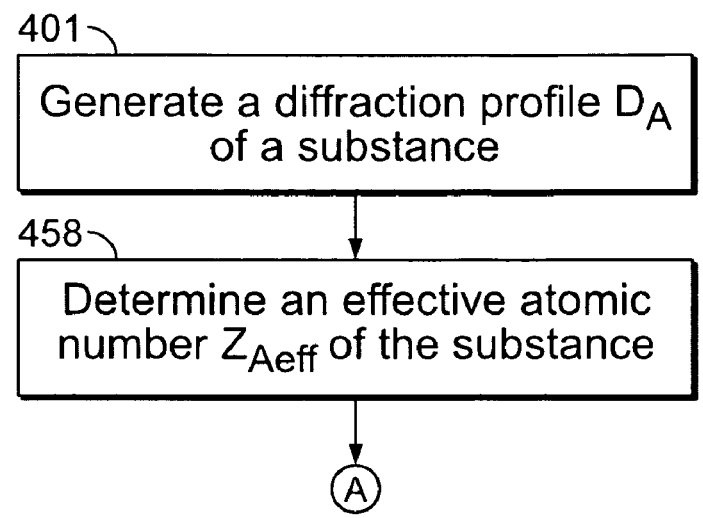
FIG. 5 is a flowchart of an embodiment of a method for reducing an artifact within an image.
Figure 6:
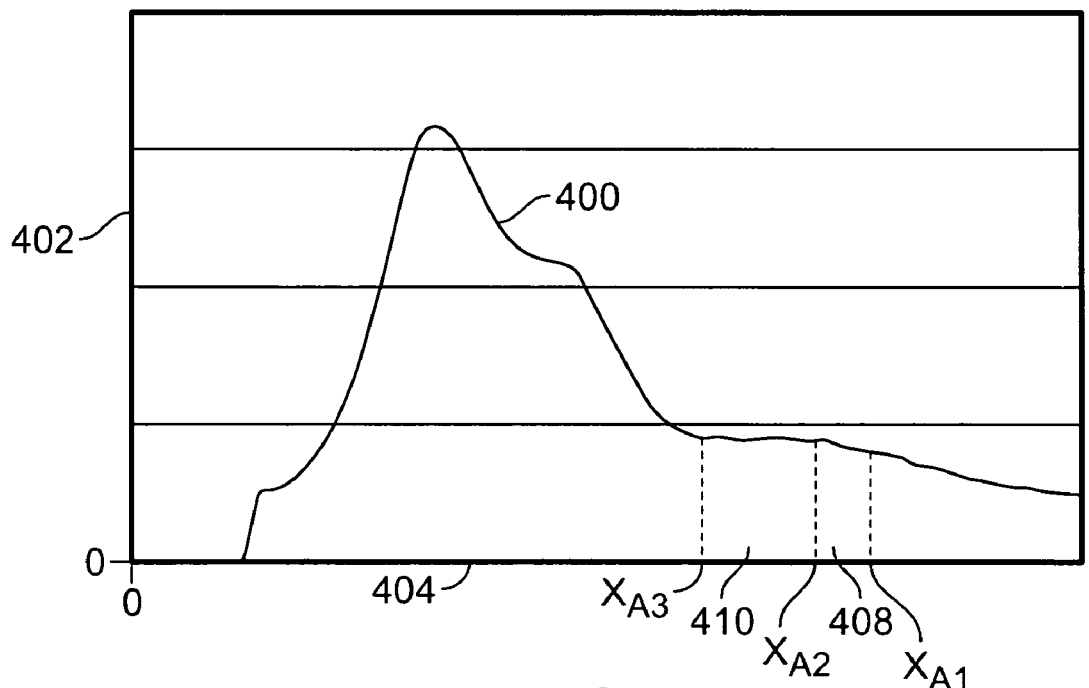
FIG. 6 shows an embodiment of a diffraction profile generated by a processor of the system of FIG. 3.

FIG. 5 is a flowchart of an embodiment of a method for reducing an artifact within an image and FIG. 6 shows a graph 400 or a diffraction profile $D(x_A)$ generated 401 by processor 84. Graph 400 is a histogram having a plurality of intensity values at a plurality of momentum transfer values, such as $x_{A1}$, $x_{A2}$, and $x_{A3}$, of the momentum transfer $x_A$. As an example, when an operating voltage of one of x-ray sources 14, 16, 18, 20, 22, 24, 26, 28, and 30 is 160 kilovolts, processor 84 calculates, by applying equation (3), an energy value $E_{A1}$ of the energy $E_A$ to be 160 kilo electron Volts (keV), calculates, by applying equation (3), an energy value $E_{A2}$ of the energy $E_A$ to be 140 keV, and calculates, by applying equation (3), an energy value $E_{A3}$ of the energy value $E_A$ to be 120 keV. In the example, the photon energy values $E_{A1}$, $E_{A2}$, and $E_{A3}$ correspond, through equation (3), to $x_{A1}$ of four inverse nanometers of the momentum transfer $x_A$, $x_{A2}$ of 3.5 inverse nanometers of the momentum transfer $x_A$, and to $x_{A3}$ of three inverse nanometers of the momentum transfer $x_A$, respectively. Graph 400 represents a histogram of a number of x-ray photons detected by scatter detector 34 when x-ray sources 14, 16, 18, 20, 22, 24, 26, 28, and 30 are activated sequentially once either clockwise or counterclockwise versus the momentum transfer $x_A$ of the x-ray photons. A number of x-ray photons detected by scatter detector 34 is plotted along an ordinate 402 and the momentum transfer $x_A$ is plotted along an abscissa 404. As an example, abscissa 404 extends from and includes zero inverse nanometers to at most 10 inverse nanometers. An example of a total number of bins of numbers of x-ray photons plotted on ordinate 402 lies between 64 and 1024. An example of a number of x-ray photons detected by scatter detector 34 per examination lies between 1000 and 100,000.

The diffraction profile $D(x_A)$ ranging from $x_A \geq 3$ $nm^{-1}$ is dominated by coherent scatter from free atoms of unknown substance 67. In a first tip region, extending from $x_{A1}$ to $x_{A3}$, of graph 400, an intensity of scattered radiation detected by scatter detector 34 upon activating x-ray sources 14, 16, 18, 20, 22, 24, 26, 28, and 30 once either clockwise or counterclockwise is proportional to a product of density, such as a mean density, of unknown substance 67 and a power, such as ranging between 2.5 and 3.5, of a mean atomic number of a plurality of constituents or materials within unknown substance 67.

A cumulative number of x-ray photons that are scattered with momentum transfer values between $x_{A1}$ and $x_{A2}$ are represented within a band 408 under graph 400. Processor 84 determines a cumulative number of x-ray photons within band 408 by cumulatively summing a number of x-ray photons between momentum transfer values $x_{A1}$ and $x_{A2}$ on abscissa 404. A cumulative number of x-ray photons that are scattered with momentum transfer values between $x_{A2}$ and $x_{A3}$ are located within a band 410 under graph 400. Processor 84 determines a cumulative number of x-ray photons within band 410 by cumulatively summing a number of x-ray photons between momentum transfer values $x_{A2}$ and $x_{A3}$ on abscissa 404.

Figure 7:
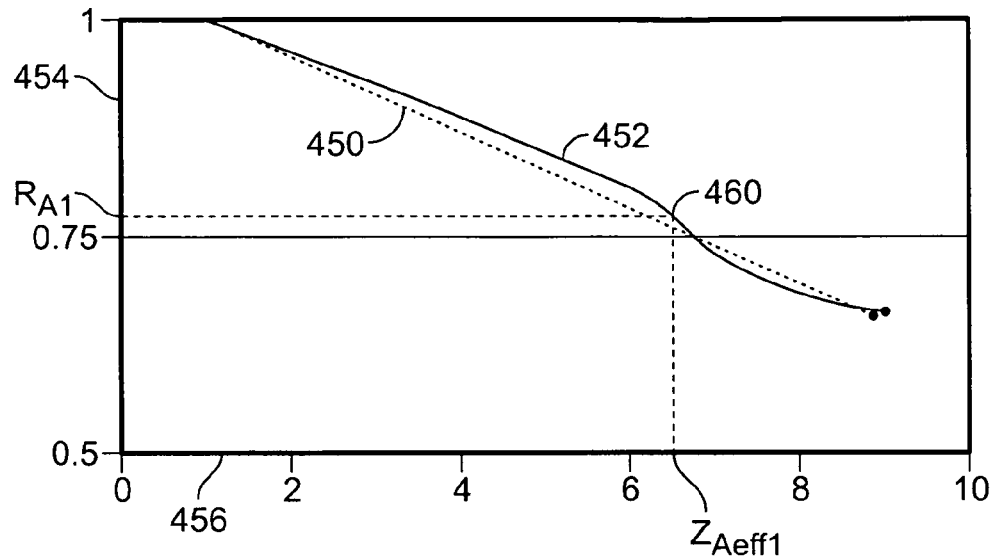
FIG. 7 shows an embodiment of a dotted line and an embodiment of a solid curve generated by the processor.

FIG. 7 shows a dotted line 450 and a solid curve 452 generated by processor 84. Solid curve 452 represents a theoretical relationship between a ratio of total free atom scatter cross-sections, referred to as total scatter cross-sections or cumulative scatter cross-sections, and an atomic number Z. As an example, processor 84 plots solid curve 452 from an example of the theoretical relationship mentioned in Hubbell, J. H., Veigele, W. J., Briggs, E. A., Brown, R. T., Cromer, D. T., Howerton, R. J., Atomic Form Factors, Incoherent Scattering Functions and Photon Scattering Cross-sections, Journal of Physics and Chemical Reference Data, Volume 4, page 471 (1975), Erratum: Atomic Form Factors, Incoherent Scattering Functions, and Photon Scattering Cross Sections, Journal of Physics and Chemical Reference Data, Volume 6, page 615 (1977). As another example, the theoretical relationship includes an atomic number value of oxygen as eight corresponding to a ratio of 0.68 of total scatter cross-sections calculated for oxygen. As yet another example, the theoretical relationship includes an atomic number value of carbon as six corresponding to a ratio of 0.73 of total scatter cross-sections calculated from carbon. Processor 84 generates dotted line 450 as a linear fit or linear regression to the theoretical relationship.

A plurality of ratios of total scatter cross-sections are plotted along an ordinate 454 and a plurality of atomic numbers Z are measured along an abscissa 456. For example, a plurality of atomic number values extend, along abscissa 456, from an atomic number one of hydrogen to an atomic number nine of Fluorine, and a range from a ratio of total scatter cross-sections evaluated at momentum transfer values within a first set of regions of bands 408 and 410 to a ratio of total scatter cross-sections evaluated at momentum transfer values within a second set of regions of bands 408 and 410 extends along ordinate 454.

Processor 84 calculates a ratio of cumulative numbers of x-ray photons within bands 408 and 410. For example, processor 84 determines that $R_{A1}$ is a ratio of a cumulative number of x-ray photons within band 408 to a cumulative number of x-ray photons within band 410. Processor 84 determines 458, by using the solid curve 452, an effective atomic number $Z_{Aeff}$ corresponding to a ratio of a cumulative number of x-ray photons within band 408 and a cumulative number of x-ray photons within band 410. As an example, processor 84 perpendicularly extends a horizontal line from the ratio $R_{A1}$ to intersect solid curve 452 at an intersection point 460 and extends a line from intersection point 460 to perpendicularly intersect abscissa 456 at an effective atomic number value $Z_{Aeff1}$. Alternatively, processor 84 determines, by using the dotted line 450, the effective atomic number $Z_{Aeff}$ corresponding to a ratio of a cumulative number of x-ray photons within band 408 and a cumulative number of x-ray photons within band 410. As an example, processor 84 perpendicularly extends a horizontal line from the ratio $R_{A1}$ to intersect dotted line 450 at an intersection point and extends a line from the intersection point to perpendicularly intersect abscissa 456 at an effective atomic number value $Z_{Aeff2}$.

Figure 8:
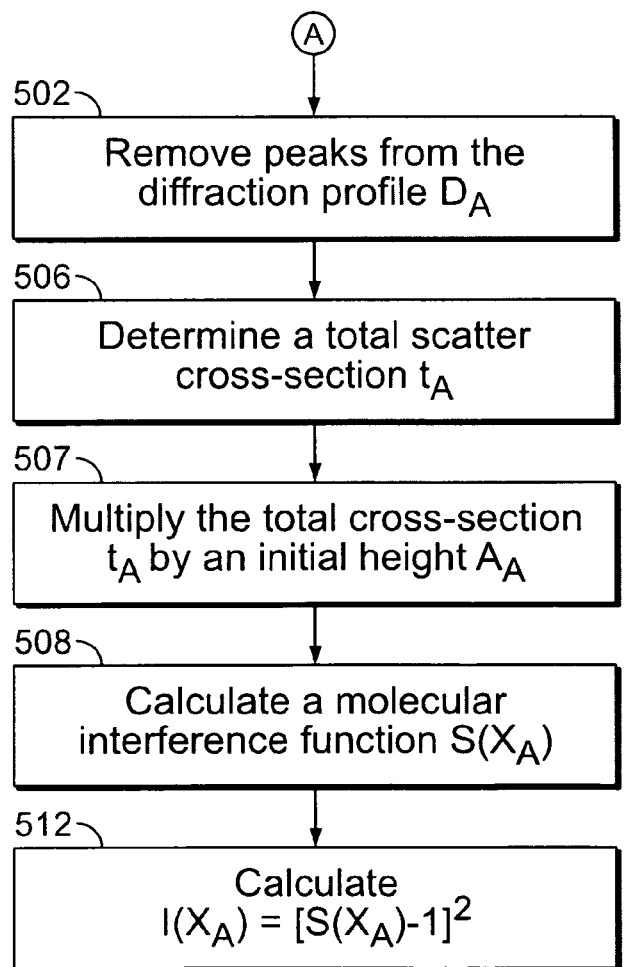
FIG. 8 is a continuation of the flowchart of FIG. 5.
Figure 9:
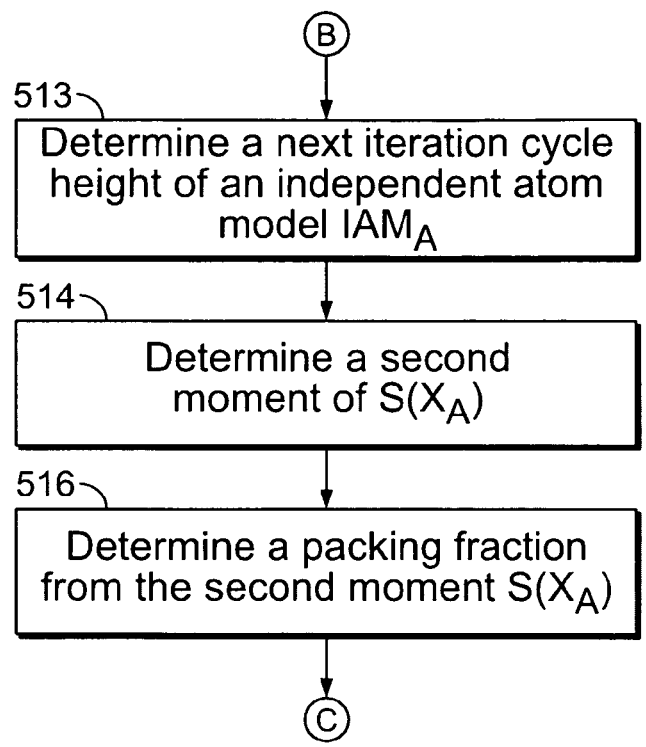
FIG. 9 is a continuation of the flowchart of FIG. 8.
Figure 10:
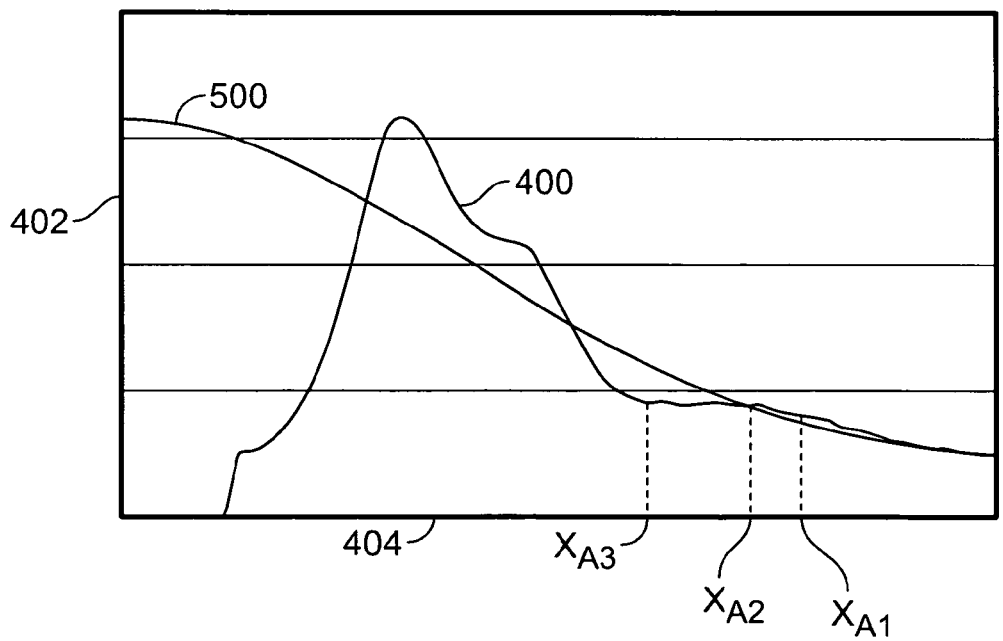
FIG. 10 shows an embodiment of an independent atom model curve generated by the processor.
Figure 11:
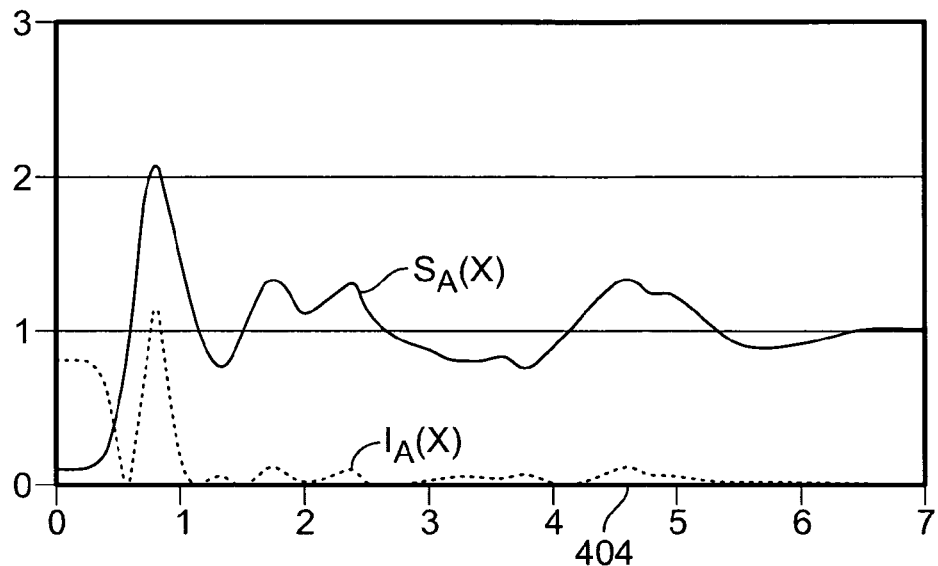
FIG. 11 shows a plurality of embodiments of a plurality of graphs generated by the processor.

FIGS. 8 and 9 are a flowchart of an embodiment of a method for reducing an artifact within an image, FIG. 10 shows an embodiment of an independent atom model ($IAM_A$) curve 500 generated by processor 84, and FIG. 11 shows a plurality of embodiments of a plurality of graphs $s(x_A)$ and $I(x_A)$ generated by processor 84. The graph $s(x_A)$ represents a molecular interference function corresponding to unknown substance 67 and the graph $I(x_A)$ represents an approximation function corresponding to unknown substance 67. Processor 84 removes 502 a plurality of crystalline interference peaks from graph 400 by applying a peak removal algorithm. An example of the peak removal algorithm is provided in a software, such as an "OptiFit" computer software, described in Rabiej M, Determination of the Degree of Crystallinity of Semicrystalline Polymers by Means of the "OptiFit" Computer Software, POLIMERY 6, pages 423-427 (2002). In an alternative embodiment, processor 84 removes all crystalline interference peaks that represents a crystallinity of unknown substance 67 and that are located within the diffraction profile $D(x_A)$ by applying the peak removal algorithm. For example, in case of quasi-amorphous or alternatively partially crystalline substances, a plurality of crystalline interference peaks may be included within graph 400 and processor 84 removes the crystalline interference peaks by applying the peak removal algorithm. The peak removal algorithm is applied to generate a peak-removed graph, such as graph 400.

Processor 84 determines 506 a total scatter cross-section $t_A$ of $IAM_A$ curve 500 from the effective atomic number $Z_{Aeff}$ that is determined from scattered radiation generated when x-ray sources 14, 16, 18, 20, 22, 24, 26, 28, and 30 are activated sequentially once either clockwise or counterclockwise to scan unknown substance 67. For example, upon determining by processor 84 that the effective atomic number value $Z_{Aeff1}$ is a first rational number, such as 6.3, processor 84 generates a first weighted average of a plurality of $IAM_A$ functions corresponding to neighboring atomic numbers six and seven. In the example, processor 84 generates the first weighted average, such as ⅓[IAM(6)]+⅔[IAM(7)], where IAM(6) is a total scatter cross-section for carbon and IAM(7) is a total scatter cross-section for nitrogen. An example of the $IAM_A$ functions corresponding to neighboring atomic numbers are available in Hubbell, J. H., Veigele, W. J., Briggs, E. A., Brown, R. T., Cromer, D. T., Howerton, R. J., Atomic Form Factors, Incoherent Scattering Functions and Photon Scattering Cross-sections, Journal of Physics and Chemical Reference Data, Volume 4, page 471 (1975), Erratum: Atomic Form Factors, Incoherent Scattering Functions, and Photon Scattering Cross Sections, Journal of Physics and Chemical Reference Data, Volume 6, page 615 (1977). The first weighted average is an example of the total scatter cross-section $t_A$, determined in 506, of $IAM_A$ curve 500.

Alternatively, instead of generating the first weighted average, upon determining by processor 84 that the effective atomic number value $Z_{Aeff1}$ is the first rational number, processor 84 generates a closest total scatter cross-section of an IAM curve corresponding to an atomic number value, which is an integer closest to the first rational number and plots, with respect to ordinate 402, the closest total scatter cross-section. In yet another alternative embodiment, instead of generating the first weighted average, upon determining by processor 84 that the effective atomic number value $Z_{Aeff1}$ is the first rational number, processor 84 generates a first universal total scatter cross-section of an IAM curve by scaling the momentum transfer $x_A$ of $IAM_A$ curve 500 in FIG. 10. As an example, the momentum transfer $x_A$ of $IAM_A$ curve 500 is scaled by multiplying the momentum transfer $x_A$ of $IAM_A$ curve 500 with 0.02 $Z_{Aeff1}$+0.12 to generate the first universal total scatter cross-section.

Processor 84 multiplies 507 the total scatter cross-section $t_A$, determined in 506, by an initial amplitude $A_A$ or an initial height to generate a first iteration cycle free atom curve $C_A$. For example, processor 84 multiplies each value of the total scatter cross-section $t_A$, determined in 506, with the initial height $A_A$ to generate the first iteration cycle free atom curve $C_A$. Processor 84 receives the initial height $A_A$ from the user via input device 86. Processor 84 calculates 508 the molecular interference function $s(x_A)$ by dividing a number of x-ray photons represented by graph 400 by the first iteration cycle free atom curve $C_A$. As an example, processor 84 generates a molecular interference value $s(x_{A1})$ of the molecular interference function $s(x_A)$ by dividing a number of x-ray photons having the momentum transfer value $x_{A1}$ that lies on graph 400 by a number of x-ray photons having the momentum transfer value $x_{A1}$ that lies on first iteration cycle free atom curve $C_A$. As another example, processor 84 generates a molecular interference value $s(x_{A2})$ of the molecular interference function $s(x_A)$ by dividing a number of x-ray photons having the momentum transfer value $x_{A2}$ that lies on graph 400 by a number of x-ray photons having the momentum transfer value $x_{A2}$ that lies on first iteration cycle free atom curve $C_A$.

Processor 84 calculates 512 the approximation function $I(x_A)$ as $$I(x_A) = [s(x_A) - 1]^2 \quad (4)$$

Processor 84 determines 513 a next iteration cycle amplitude $I_{Amin}$ or a next iteration cycle height of $IAM_A$ curve 500 by minimizing an integral of $I(x_A)$ represented as $$\int_0^{x_{Amax}} I(x_A) dx_A \quad (5)$$

where $x_{Amax}$ is the largest value of $x_A$ on abscissa 404 of graph 400 and IAM curve 500. For example, processor 84 determines the next iteration cycle height $I_{Amin}$ by selecting a minimum from a first and a second calculated value. Processor 84 determines the first calculated value by applying 507, 508, 512, and equation (5) to the initial height $A_A$. Processor 84 determines the second calculated value by applying 507, 508, 512, and equation (5) to a changed height $B_A$ instead of the initial height $A_A$. For example, processor 84 multiplies the total scatter cross-section $t_A$, determined in 506, by the changed height $B_A$ to generate a second iteration cycle free atom curve $S_A$, calculates the molecular interference function $s(x_A)$ by dividing a number of x-ray photons represented by graph 400 by the second iteration cycle free atom curve $S_A$, calculates the approximation function $I(x_A)$ from equation (4), and generates the second calculated value by applying equation (5). Processor 84 generates the changed height $B_A$ by modifying, such as incrementing or decrementing, the initial height $A_A$. As another example, processor 84 determines the next iteration cycle height $I_{Amin}$ by selecting a minimum from a plurality, such as three, of calculated values, such as the first calculated value, the second calculated value, and a third calculated value. Processor 84 generates the third calculated value in a similar manner in which first and second calculated values are generated. For example, processor 84 generates the third calculated value after incrementing or alternatively decrementing the changed height $B_A$.

Processor 84 determines 514 a second moment $X2S_A$ of $I(x_A)$ by applying $$X2S_A = \frac{\int_0^\infty x_A^2 I_{Amin}(x_A) dx_A}{\int_0^\infty I_{Amin}(x_A) dx_A} \quad (6)$$

Processor 84 determines 516 a packing fraction $\eta_A$ of unknown substance 67 as being linearly proportional, such as equal, to the second moment $X2S_A$. The packing fraction $\eta_A$ is linearly proportional to the second moment $X2S_A$ when unknown substance 67 includes a plurality of identical hard spheres over a range of $\eta_A$ of amorphous materials relevant in explosive and/or contraband detection. An example of the linearly proportional relationship includes $$\eta_A = a(X2S_A) \quad (7)$$

where a is a coefficient received by processor 84 via input device 86 from the user, a ranges from and including 0.1 to 0.2.

A scan of a known substance B is conducted by placing the known substance B, in place of container 56, within opening 60. The known substance B has a known linear attenuation coefficient $\mu_B$ that is stored in memory device 90. As an example, the linear attenuation coefficient $\mu_B$ is input by the user via input device 86 to memory device 90 before the scan of the known substance B is conducted. As another example, the linear attenuation coefficient $\mu_B$ is stored within memory device 90 without a need to generate an x-ray image of the known substance B and the x-ray image of the known substance B may be generated by placing the known substance B within opening 60 and receiving a plurality of transmission electrical output signals representing linear attenuation by the known substance B. The scan of the known substance B is conducted to generate a plurality of scatter electrical output signals, which are output by scatter detector 34. The scan of the known substance B is conducted in a manner similar to conducting a scan of unknown substance 67 except a plurality of transmission electrical output signals are not generated from the scan of the known substance B. The scan of the known substance B is conducted by sequentially activating x-ray sources 14, 16, 18, 20, 22, 24, 26, 28, and 30 once either clockwise or counterclockwise. A plurality of correction output signals are generated from the scatter electrical output signals generated by detecting scattered radiation from the known substance B. The plurality of correction output signals corresponding to the known substance B are generated by from the scatter electrical output signals generated by detecting scattered radiation from the known substance B in a manner similar to that of generating correction output signals 280, 282, 284, 286, 288, 290, 292, and 294 from scatter electrical output signals 196, 198, 200, 202, 204, 206, 208, 210, and 212. Processor 84 receives the correction output signals corresponding to the known substance B to generate a momentum transfer $x_B$ from an energy spectrum $r(E_B)$ of energy $E_B$ of x-ray quanta within scattered radiation that is generated by the known substance B and that is detected by scatter detector 34. Processor 84 generates the momentum transfer $x_B$ by applying $$x_B = (E_B/hc)\sin(\eta/2) \quad (8)$$

Figure 12:
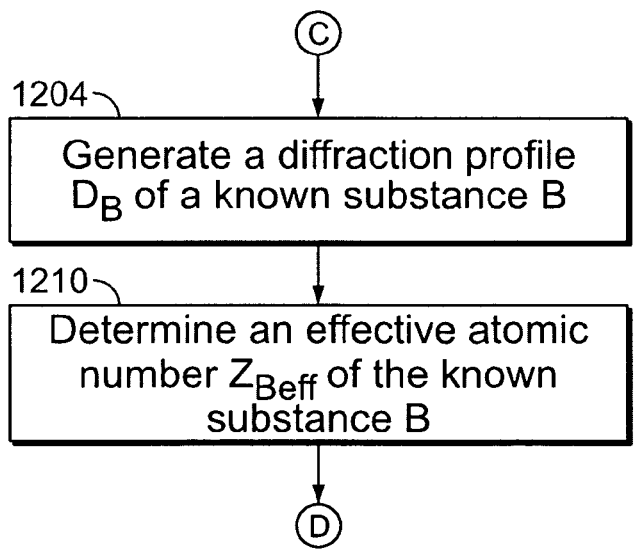
FIG. 12 is a continuation of the flowchart of FIG. 9.
Figure 13:
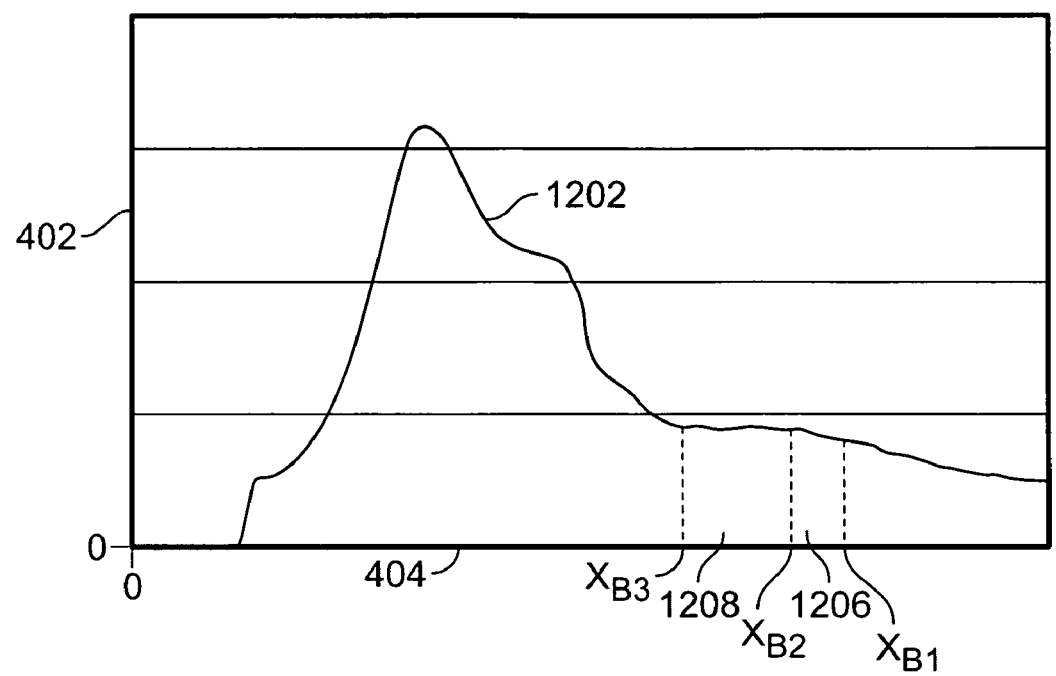
FIG. 13 shows another embodiment of a diffraction profile generated by the processor.

FIG. 12 is a flowchart of an embodiment of a method for reducing an artifact within an image and FIG. 13 shows a graph 1202 or a diffraction profile $D(x_B)$ generated 1204 by processor 84. Graph 1202 is a histogram having a plurality of intensity values at a plurality of momentum transfer values, such as $x_{B1}$, $x_{B2}$, and $x_{B3}$, of the momentum transfer $x_B$. As an example, when an operating voltage of one of x-ray sources 14, 16, 18, 20, 22, 24, 26, 28, and 30 is 160 kilovolts, processor 84 calculates, by applying equation (8), an energy value $E_{B1}$ of the energy $E_B$, calculates, by applying equation (8), an energy value $E_{B2}$ of the energy $E_B$, and calculates, by applying equation (8), an energy value $E_{B3}$ of the energy value $E_B$. In the example, the photon energy values $E_{B1}$, $E_{B2}$, and $E_{B3}$ correspond, through equation (8), to the momentum transfer value $x_{B1}$ of the momentum transfer $x_B$, to the momentum transfer value $x_{B2}$ of the momentum transfer $x_B$, and to the momentum transfer value $x_{B3}$ of the momentum transfer $x_B$, respectively. Graph 1202 represents a histogram of a number of x-ray photons detected by scatter detector 34 when x-ray sources 14, 16, 18, 20, 22, 24, 26, 28, and 30 are activated sequentially once either clockwise or counterclockwise to scan the known substance B versus the momentum transfer $x_B$ of the x-ray photons. A number of x-ray photons detected by scatter detector 34 upon scanning the known substance B is plotted along ordinate 402 and the momentum transfer $x_B$ is plotted along abscissa 404.

The diffraction profile $D(x_B)$ ranging from $x_B \geq x_{B3}$ nm$^{-1}$ is dominated by coherent scatter from free atoms of the known substance B. In a second tip region, extending from $x_{B1}$ to $x_{B3}$, of graph 1202, an intensity of the scattered radiation is proportional to a product of density, such as a mean density, of the known substance B and a power of a mean atomic number of a plurality of constituents within the known substance B.

A cumulative number of x-ray photons that are scattered with momentum transfer values between $x_{B1}$ and $x_{B2}$ are represented within a band 1206 under graph 1202. Processor 84 determines a cumulative number of x-ray photons within band 1206 by cumulatively summing a number of x-ray photons between momentum transfer values $x_{B1}$ and $x_{B2}$ on abscissa 404. A cumulative number of x-ray photons that are scattered with momentum transfer values between $x_{B2}$ and $x_{B3}$ are located within a band 1208 under graph 1202. Processor 84 determines a cumulative number of x-ray photons within band 1208 by cumulatively summing a number of x-ray photons between momentum transfer values $x_{B2}$ and $x_{B3}$ on abscissa 404.

Figure 14:
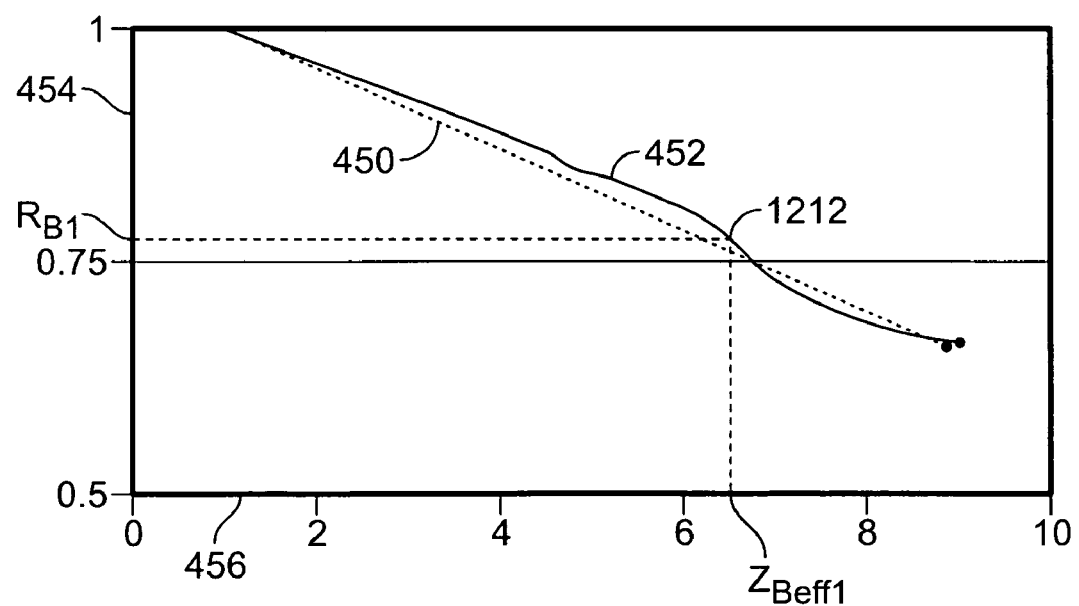
FIG. 14 shows the dotted line and the solid curve generated by the processor.

FIG. 14 shows dotted line 450 and solid curve 452 generated by processor 84. Processor 84 calculates a ratio of cumulative numbers of x-ray photons within bands 1206 and 1208. For example, processor 84 determines that $R_{B1}$ is a ratio of a cumulative number of x-ray photons within band 1206 to a cumulative number of x-ray photons within band 1208. Processor 84 determines 1210, by using the solid curve 452, an effective atomic number $Z_{Beff}$ corresponding to a ratio of a cumulative number of x-ray photons within band 1206 and a cumulative number of x-ray photons within band 1208. As an example, processor 84 perpendicularly extends a horizontal line from the ratio $R_{B1}$ to intersect solid curve 452 at an intersection point 1212 and extends a line from intersection point 1212 to perpendicularly intersect abscissa 456 at an effective atomic number value $Z_{Beff1}$. Alternatively, processor 84 determines, by using the dotted line 450, the effective atomic number $Z_{Beff}$ corresponding to a ratio of a cumulative number of x-ray photons within band 1206 and a cumulative number of x-ray photons within band 1208. As an example, processor 84 perpendicularly extends a horizontal line from the ratio $R_{B1}$ to intersect dotted line 450 at an intersection point and extends a line from the intersection point to perpendicularly intersect abscissa 456 at an effective atomic number value $Z_{Beff2}$.

Figure 15:
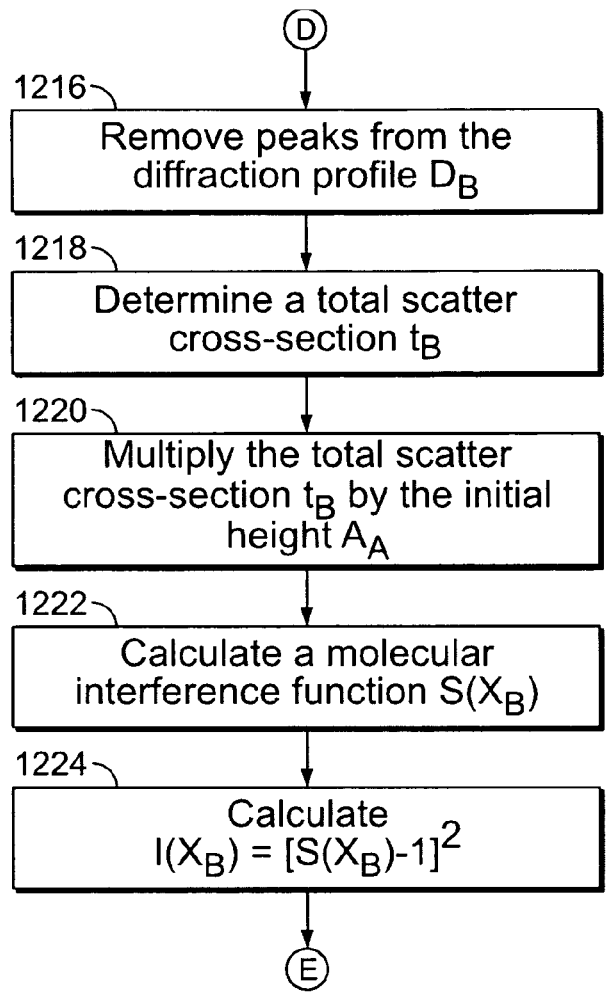
FIG. 15 a continuation of the flowchart of FIG. 12.
Figure 16:
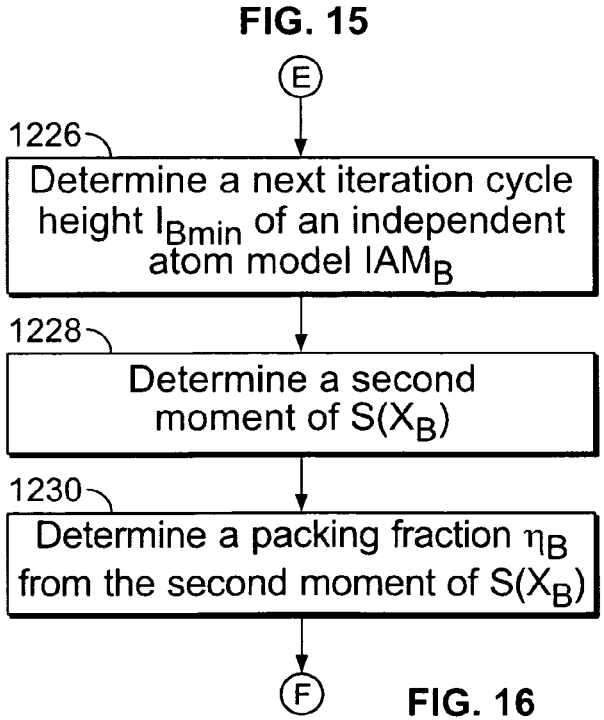
FIG. 16 a continuation of the flowchart of FIG. 15.
Figure 17:
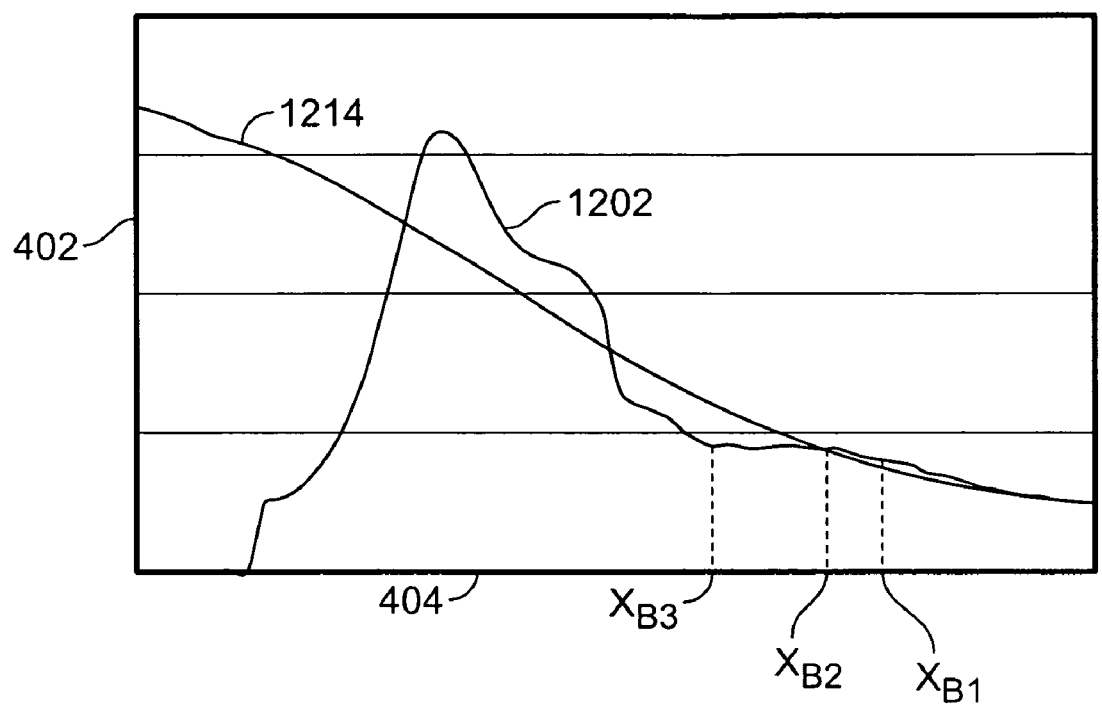
FIG. 17 shows another embodiment of an independent atom model curve generated by the processor.
Figure 18:
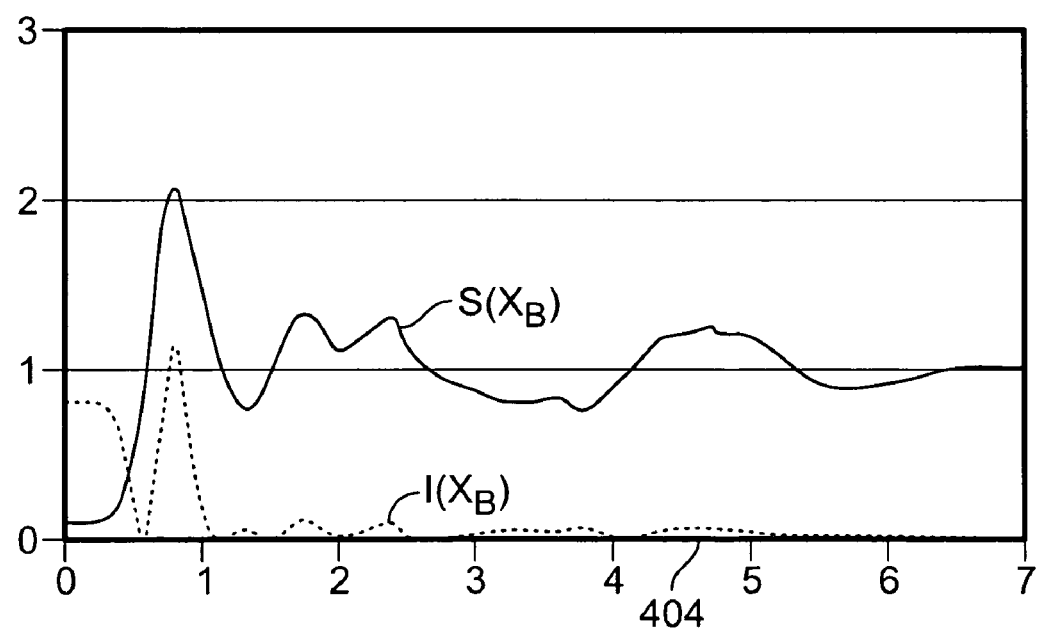
FIG. 18 shows a plurality of embodiments of a plurality of graphs generated by the processor.
Figure 19:
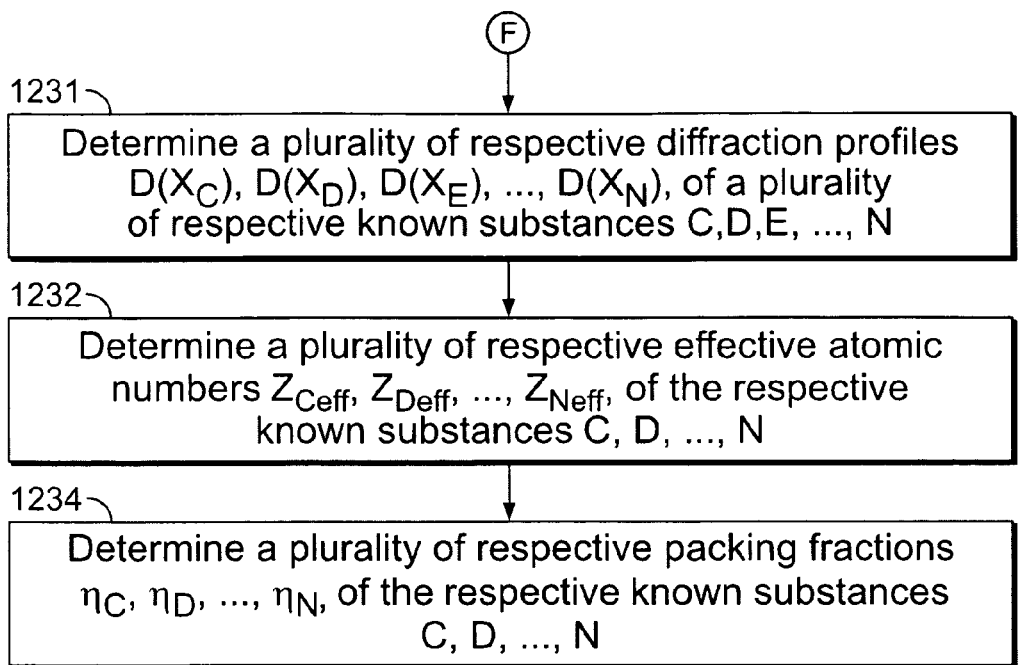
FIG. 19 is a continuation of the flowchart of FIG. 16.
Figure 20:
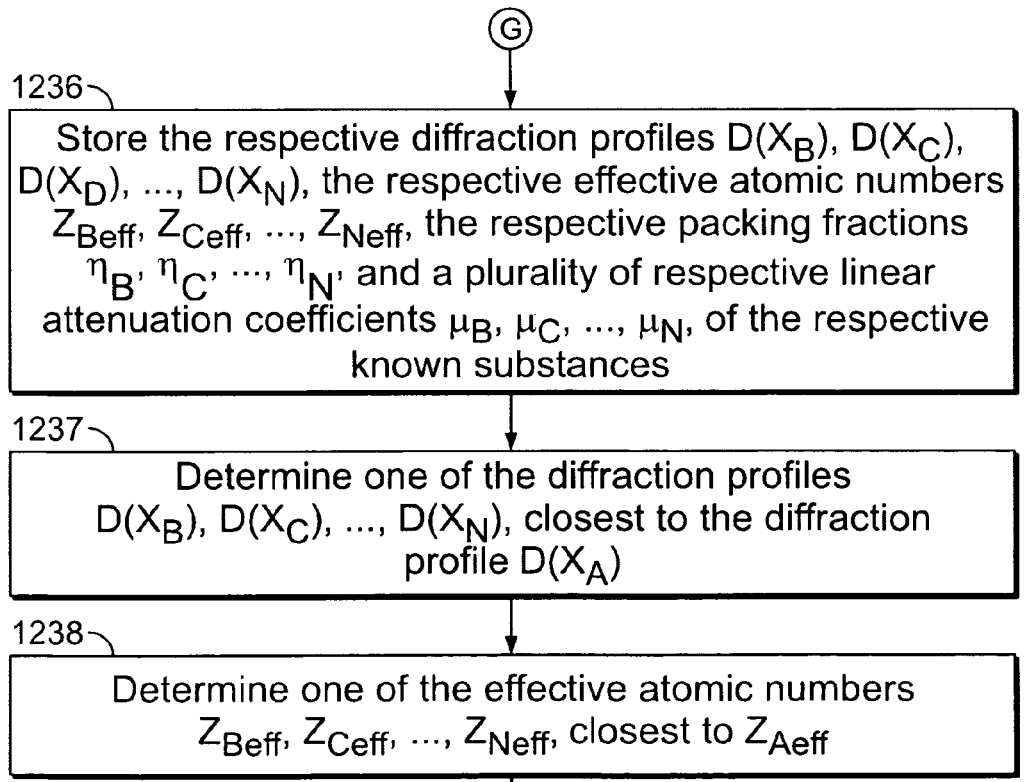
FIG. 20 is a continuation of the flowchart of FIG. 19.
Figure 21:
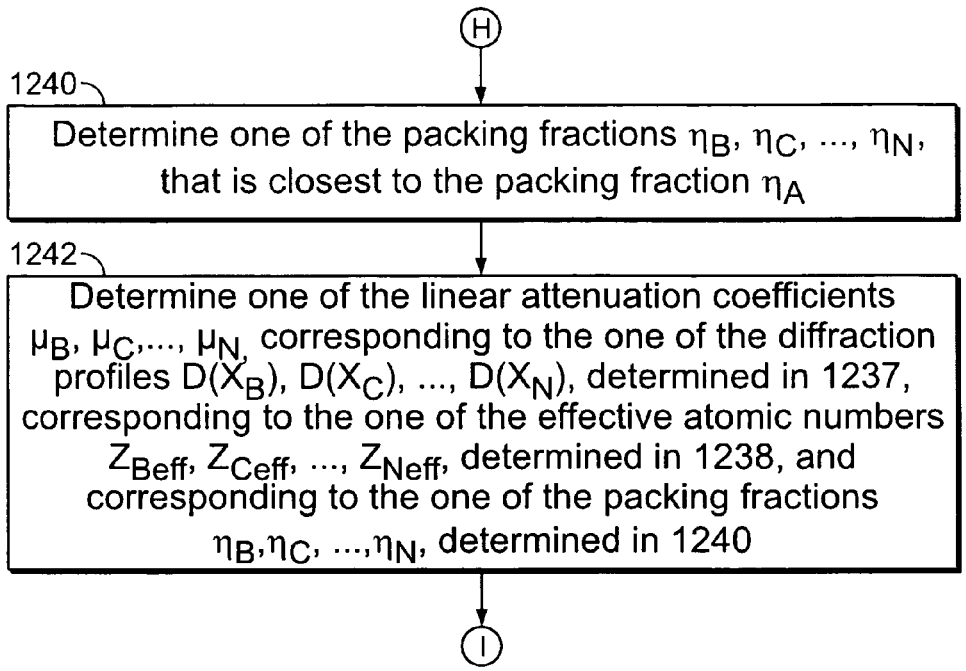
FIG. 21 is a continuation of the flowchart of FIG. 20.
Figure 22:
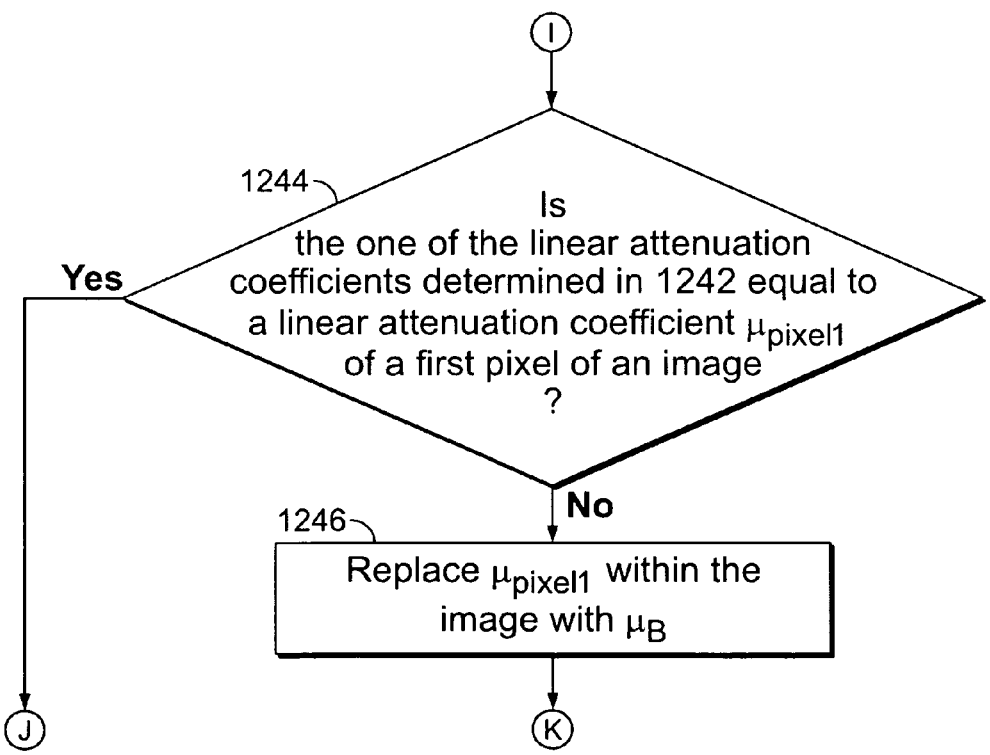
FIG. 22 is a continuation of the flowchart of FIG. 21.
Figure 23:
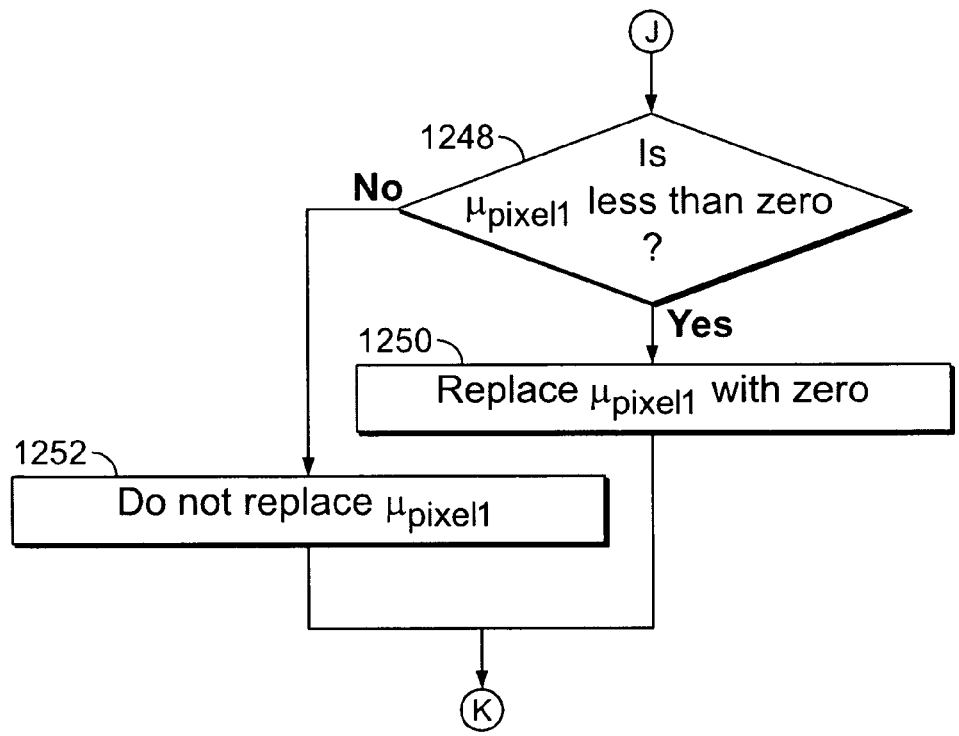
FIG. 23 is a continuation of the flowchart of FIG. 22.
Figure 24:
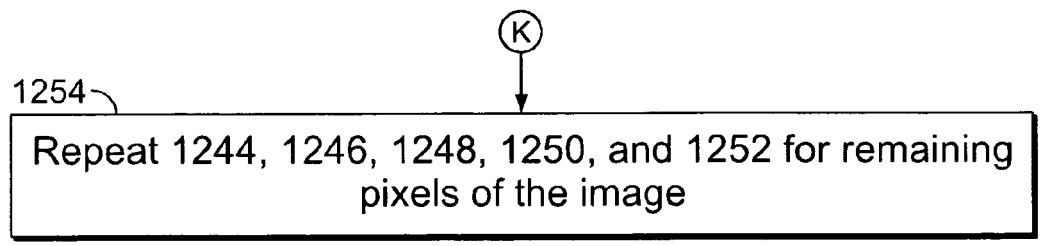
FIG. 24 is a continuation of the flowchart of FIGS. 22 and 23.

FIGS. 15 and 16 are a flowchart of an embodiment of a method for reducing an artifact within an image, FIG. 17 shows an embodiment of an independent atom model (IAM$_B$) curve 1214 generated by processor 84, and FIG. 18 shows a plurality of embodiments of a plurality of graphs $s(x_B)$ and $I(x_B)$ generated by processor 84. The graph $s(x_B)$ represents a molecular interference function corresponding to the known substance B and the graph $I(x_B)$ represents an approximation function corresponding to the known substance B. Processor 84 removes 1216 a plurality of crystalline interference peaks from graph 1202 by applying the peak removal algorithm. In an alternative embodiment, processor 84 removes all crystalline interference peaks that represents a crystallinity of the known substance B and that are located within the diffraction profile $D(x_B)$ by applying the peak removal algorithm. The peak removal algorithm is applied to generate a peak-removed graph, such as graph 1202.

Processor 84 determines 1218 a total scatter cross-section $t_B$ of IAM$_B$ curve 1214 from the effective atomic number $Z_{Beff}$ that is determined from scattered radiation generated when x-ray sources 14, 16, 18, 20, 22, 24, 26, 28, and 30 are activated sequentially once either clockwise or counterclockwise to scan the known substance B. For example, upon determining by processor 84 that the effective atomic number value $Z_{Beff1}$ is a second rational number, such as 1.3, processor 84 generates a second weighted average of a plurality of IAM$_B$ functions corresponding to neighboring atomic numbers one and two. In the example, processor 84 generates the second weighted average, such as ⅓[IAM(1)]+⅔[IAM(2)], where IAM(1) is a total scatter cross-section for Hydrogen and IAM(2) is a total scatter cross-section for Helium. An example of the IAM$_B$ functions corresponding to neighboring atomic numbers are available in Hubbell, J. H., Veigele, W. J., Briggs, E. A., Brown, R. T., Cromer, D. T., Howerton, R. J., Atomic Form Factors, Incoherent Scattering Functions and Photon Scattering Cross-sections, Journal of Physics and Chemical Reference Data, Volume 4, page 471 (1975), Erratum: Atomic Form Factors, Incoherent Scattering Functions, and Photon Scattering Cross Sections, Journal of Physics and Chemical Reference Data, Volume 6, page 615 (1977). The second weighted average is an example of the total scatter cross-section $t_B$, determined in 1218, of IAM$_B$ curve 1214.

Alternatively, instead of generating the second weighted average, upon determining by processor 84 that the effective atomic number value $Z_{Beff1}$ is the second rational number, processor 84 generates a closest total scatter cross-section of an IAM curve corresponding to an atomic number value, which is an integer closest to the second rational number and plots, with respect to ordinate 402, the closest total scatter cross-section. In yet another alternative embodiment, instead of generating the second weighted average, upon determining by processor 84 that the effective atomic number value $Z_{Beff1}$ is the second rational number, processor 84 generates a second universal total scatter cross-section of an IAM curve by scaling the momentum transfer $x_B$ of IAM$_B$ curve 1214 in FIG. 17. As an example, the momentum transfer $x_B$ of IAM$_B$ curve 1214 is scaled by multiplying the momentum transfer $x_B$ of IAM$_B$ curve 1214 with $0.02\,Z_{Beff1}+0.12$ to generate the second universal total scatter cross-section.

Processor 84 multiplies 1220 the total scatter cross-section $t_B$, determined in 1218, by the initial height $A_A$ to generate a first iteration cycle free atom curve $C_B$. For example, processor 84 multiplies each value of the total scatter cross-section $t_B$, determined in 1218, with the initial height $A_A$ to generate the first iteration cycle free atom curve $C_B$. Processor 84 calculates 1222 the molecular interference function $s(x_B)$ by dividing a number of x-ray photons represented by graph 1202 by the first iteration cycle free atom curve $C_B$. As an example, processor 84 generates a molecular interference value $s(x_{B1})$ of the molecular interference function $s(x_B)$ by dividing a number of x-ray photons having the momentum transfer value $x_{B1}$ that lies on graph 1202 by a number of x-ray photons having the momentum transfer value $x_{B1}$ that lies on first iteration cycle free atom curve $C_B$. As another example, processor 84 generates a molecular interference value $s(x_{B2})$ of the molecular interference function $s(x_B)$ by dividing a number of x-ray photons having the momentum transfer value $x_{B2}$ that lies on graph 1202 by a number of x-ray photons having the momentum transfer value $x_{B2}$ that lies on first iteration cycle free atom curve $C_B$.

Processor 84 calculates 1224 the approximation function $I(x_B)$ as $$I(x_B)=[s(x_B)-1]^2 \qquad (9)$$

Processor 84 determines 1226 a next iteration cycle amplitude $I_{Bmin}$ or a next iteration cycle height of IAM$_B$ curve 1214 by minimizing an integral of $I(x_B)$ represented as $$\int_0^{x_{Bmax}} I(x_B) dx_B \quad (10)$$

where $x_{Bmax}$ is the largest value of $x_B$ on abscissa 404 of graph 1202 and IAM curve 1214. For example, processor 84 determines the next iteration cycle height $I_{Bmin}$ by selecting a minimum from a fourth and a fifth calculated value. Processor 84 determines the fourth calculated value by applying 1220, 1222, 1224, and equation (10) to the initial height $A_A$. Processor 84 determines the fifth calculated value by applying 1220, 1222, 1224, and equation (10) to the changed height $B_A$ instead of the initial height $A_A$. For example, processor 84 multiplies the total scatter cross-section $t_B$, determined in 1218, by the changed height $B_A$ to generate a second iteration cycle free atom curve $S_B$, calculates the molecular interference function $s(x_B)$ by dividing a number of x-ray photons represented by graph 1202 by the second iteration cycle free atom curve $S_B$, calculates the approximation function $I(x_B)$ from equation (9), and generates the fourth calculated value by applying equation (10). As another example, processor 84 determines the next iteration cycle height $I_{Bmin}$ by selecting a minimum from a plurality, such as three, of calculated values, such as the fourth calculated value, the fifth calculated value, and a sixth calculated value. Processor 84 generates the sixth calculated value in a similar manner in which fourth and fifth calculated values are generated. For example, processor 84 generates the sixth calculated value after incrementing or alternatively decrementing the changed height $B_A$.

Processor 84 determines 1228 a second moment $X2S_B$ of $I(x_B)$ by applying $$X2S_B = \frac{\int_0^\infty m_B^2 I_{Bmin}(x_B) dx_B}{\int_0^\infty I_{Bmin}(x_B) dx_B} \quad (11)$$

Processor 84 determines 1230 a packing fraction $\eta_B$ of the known substance B as being linearly proportional, such as equal, to the second moment $X2S_B$. The packing fraction $\eta_B$ is linearly proportional to the second moment $X2S_B$ when the known substance B includes a plurality of identical hard spheres over a range of $\eta_B$ of amorphous materials relevant in explosive and/or contraband detection. An example of the linearly proportional relationship includes $$\eta_B = a(X2S_B) \quad (12)$$

FIGS. 19-24 are a flowchart of an embodiment of a method for reducing an artifact within an image. Processor 84 determines 1231 a plurality of respective diffraction profiles $D(x_C), D(x_D), D(x_E), \ldots, D(x_N)$, of a plurality of respective known substances C, D, E, . . . , N in a manner similar to that of determining the diffraction profile $D(x_B)$ of the known substance B. Processor 84 determines 1232 a plurality of respective effective atomic numbers $Z_{Ceff}, Z_{Deff}, Z_{Eeff}, \ldots, Z_{Neff}$, of the respective known substances C, D, E, . . . , N in a manner similar to that of determining the effective atomic number $Z_{Beff}$ of the known substance B. A plurality of respective linear attenuation coefficients $\mu_C, \mu_D, \mu_E, \ldots, \mu_N$ of the respective known substances C, D, E, . . . , N are input by the user via input device 86 to memory device 90. For example, the linear attenuation coefficient $\mu_C$ of the known substance C is input to processor 84 before a scan of the known substance C is conducted by placing the known substance C in opening 60. As another example, the linear attenuation coefficient $\mu_C$ is stored within memory device 90 without a need to generate an x-ray image of the known substance C and the x-ray image of the known substance C may be generated by placing the known substance C within opening 60 and receiving a plurality of transmission electrical output signals representing linear attenuation by the known substance C. The scan of the known substance C is conducted to generate a plurality of scatter electrical output signals, which are output by scatter detector 34. The scan of the known substance C is conducted in a manner similar to conducting a scan of unknown substance 67 except a plurality of transmission electrical output signals are not generated from the scan of the known substance C. The scan of the known substance C is conducted by sequentially activating x-ray sources 14, 16, 18, 20, 22, 24, 26, 28, and 30 once either clockwise or counterclockwise.

Moreover, processor 84 determines 1234 a plurality of respective packing fractions $\eta_C, \eta_D, \eta_E, \ldots \eta_N$ of the respective known substances C, D, E, . . . N in a manner similar to that of determining the packing fraction $\eta_B$ of the known substance B. Processor 84 stores 1236 the diffraction profiles $D(x_B), D(x_C), D(x_D), \ldots, D(x_N)$, the linear attenuation coefficients $\mu_B, \mu_C, \mu_D, \mu_E, \ldots \mu_N$, the effective atomic numbers $Z_{Beff}, Z_{Ceff}, Z_{Deff}, Z_{Eeff}, \ldots, Z_{Neff}$ and the packing fractions $\eta_B, \eta_C, \eta_D, \eta_E, \ldots \eta_N$ within a library stored within memory device 90. Processor 84 determines 1237 one of the diffraction profiles $D(x_B), D(x_C), D(x_D), \ldots, D(x_N)$, which is closest to the diffraction profile $D(x_A)$. For example, processor 84 determines that a highest number of values of the diffraction profile $D(x_B)$ are closest to the values of the diffraction profile $D(x_A)$ compared to a number of values of the remaining of the diffraction profiles $D(x_C), D(x_D), \ldots, D(x_N)$. Processor 84 determines 1238 one of the effective atomic numbers $Z_{Beff}, Z_{Ceff}, Z_{Deff}, Z_{Eeff}, \ldots, Z_{Neff}$ which is closest to the effective atomic number $Z_{Aeff}$. Processor 84 determines 1240 one of the packing fractions $\eta_B, \eta_C, \eta_D, \eta_E, \ldots \eta_N$, which is closest to the packing fraction $\eta_A$. Upon determining the one, such as $D(x_B)$, of the diffraction profiles $D(x_B), D(x_C), D(x_D), \ldots, D(x_N)$, which is closest to the effective atomic number $D(x_A)$, the one, such as $Z_{Beff}$, of the effective atomic numbers $Z_{Beff}, Z_{Ceff}, Z_{Deff}, Z_{Eeff}, \ldots, Z_{Neff}$, which is closest to the effective atomic number $Z_{Aeff}$, and upon determining the one, such as $\eta_B$, of the packing fractions $\eta_B, \eta_C, \eta_D, \eta_E, \ldots \eta_N$, which is closest to the packing fraction $\eta_A$, processor 84 determines 1242 from the library that the linear attenuation coefficient $\mu_B$ corresponds to the diffraction profile $D(x_B)$ closest to the diffraction profile $D(x_A)$, corresponds to the effective atomic number $Z_{Beff}$ closest to the effective atomic number $Z_{Aeff}$, and corresponds to the packing fraction $\eta_B$ closest to the packing fraction $\eta_A$.

Processor 84 determines 1244 whether the linear attenuation coefficient $\mu_B$, determined, in 1242, from the library, is equal to or the same as the linear attenuation coefficient $\mu_{pixel1}$. Upon determining by processor 84 that the linear attenuation coefficient $\mu_B$ is not equal to, such as less or alternatively greater, than the linear attenuation coefficient $\mu_{pixel1}$, processor 84 replaces 1246, in equation (1), the linear attenuation coefficient $\mu_{pixel1}$ with the linear attenuation coefficient $\mu_B$, generates a CT number $CT_{newpixel1}$ by applying $$CT_{newpixel1} = \frac{\mu_B - \mu_{water}}{\mu_{water}} \times 1000, \quad (13)$$

and replaces the CT number $CT_{pixel1}$ within the x-ray image generated by scanning unknown substance 67 by the CT number $CT_{newpixel1}$. Upon determining by processor 84 that the linear attenuation coefficient $\mu_B$ is equal to the linear attenuation coefficient $\mu_{pixel1}$, processor 84 determines 1248 whether the linear attenuation coefficient $\mu_{pixel1}$ is less than zero. Upon determining that the linear attenuation coefficient $\mu_{pixel1}$ is less than zero, processor 84 replaces 1250 the linear attenuation coefficient $\mu_{pixel1}$ with zero and generates a CT number $CT_{new1pixel1}$ by applying $$CT_{new1pixel1} = \frac{0 - \mu_{water}}{\mu_{water}} \times 1000, \quad (14)$$

and replaces the CT number $CT_{pixel1}$, within the x-ray image of unknown substance 67, by the CT number $CT_{new1pixel1}$. On the other hand, upon determining that the linear attenuation coefficient $\mu_{pixel1}$ is not less than zero, processor 84 does not replace 1252 the linear attenuation coefficient $\mu_{pixel1}$ with zero.

Processor 84, in 1254, repeats 1244, 1246, 1248, 1250, and 1252 for the remaining pixels of the x-ray image of unknown substance 67. For example, processor 84 determines whether the linear attenuation coefficient $\mu_B$, determined from the library, is less than the linear attenuation coefficient $\mu_{pixel2}$. Upon determining by processor 84 that the linear attenuation coefficient $\mu_B$ is not equal to the linear attenuation coefficient $\mu_{pixel2}$, processor 84 replaces, in equation (2), the linear attenuation coefficient $\mu_{pixel2}$ with the linear attenuation coefficient $\mu_B$, generates a CT number $CT_{newpixel2}$ by applying $$CT_{newpixel2} = \frac{\mu_B - \mu_{water}}{\mu_{water}} \times 1000, \quad (15)$$

and replaces the CT number $CT_{pixel2}$ within the x-ray image generated by scanning unknown substance 67 by the CT number $CT_{newpixel2}$. Upon determining by processor 84 that the linear attenuation coefficient $\mu_B$ is equal to the linear attenuation coefficient $\mu_{pixel2}$, processor 84 determines whether the linear attenuation coefficient $\mu_{pixel2}$ is less than zero. Upon determining that the linear attenuation coefficient $\mu_{pixel2}$ is less than zero, processor 84 replaces the linear attenuation coefficient $\mu_{pixel2}$ with zero and generates a CT number $CT_{new1pixel2}$ by applying $$CT_{new1pixel2} = \frac{0 - \mu_{water}}{\mu_{water}} \times 1000, \quad (16)$$

and replaces the CT number $CT_{pixel2}$, within the x-ray image of unknown substance 67, by the CT number $CT_{new1pixel2}$. On the other hand, upon determining that the linear attenuation coefficient $\mu_{pixel2}$ is not less than zero, processor 84 does not replace the linear attenuation coefficient $\mu_{pixel2}$ with zero.

It is noted that in an alternative embodiment, processor 84 performs at least one of 1237, 1238, and 1240. For example, processor 84 determines one of the diffraction profiles $D(x_B)$, $D(x_C)$, $D(x_D)$, . . . , $D(x_N)$ closest to the diffraction profile $D(x_A)$, does not determine one of the effective atomic numbers $Z_{Beff}$, $Z_{Ceff}$, $Z_{Deff}$, $Z_{Eeff}$, . . . , $Z_{Neff}$ closest to the effective atomic number $Z_{Aeff}$, and does not determine one of the packing fractions $\eta_B$, $\eta_C$, $\eta_D$, $\eta_E$, . . . $\eta_N$ closest to the packing fraction $\eta_A$. As another example, processor 84 determines one of the effective atomic numbers $Z_{Beff}$, $Z_{Ceff}$, $Z_{Deff}$, $Z_{Eeff}$, . . . , $Z_{Neff}$ closest to the effective atomic number $Z_{Aeff}$, does not determine one of the diffraction profiles $D(x_B)$, $D(x_C)$, $D(x_D)$, . . . , $D(x_N)$ closest to the diffraction profile $D(x_A)$, and does not determine one of the packing fractions $\eta_B$, $\eta_C$, $\eta_D$, $\eta_E$, . . . $\eta_N$ closest to the packing fraction $\eta_A$. As yet another example, processor 84 determines one of the effective atomic numbers $Z_{Beff}$, $Z_{Ceff}$, $Z_{Deff}$, $Z_{Eeff}$, . . . , $Z_{Neff}$ closest to the effective atomic number $Z_{Aeff}$, determines one of the diffraction profiles $D(x_B)$, $D(x_C)$, $D(x_D)$, . . . , $D(x_N)$ closest to the diffraction profile $D(x_A)$, and does not determine one of the packing fractions $\eta_B$, $\eta_C$, $\eta_D$, $\eta_E$, . . . $\eta_N$ closest to the packing fraction $\eta_A$.

In the alternative embodiment, processor 84 determines, from the library, that the linear attenuation coefficient $\mu_B$ corresponds to at least one of the diffraction profile $D(x_B)$ closest to the diffraction profile $D(x_A)$, the effective atomic number $Z_{Beff}$ closest to the effective atomic number $Z_{Aeff}$, and the packing fraction $\eta_B$ closest to the packing fraction $\eta_A$. For example, processor 84 determines, from the library, that the linear attenuation coefficient $\mu_B$ corresponds to the diffraction profile $D(x_B)$ closest to the diffraction profile $D(x_A)$. As another example, processor 84 determines, from the library, that the linear attenuation coefficient $\mu_B$ corresponds to the effective atomic number $Z_{Beff}$ closest to the effective atomic number $Z_{Aeff}$. As yet another example, processor 84 determines, from the library, that the linear attenuation coefficient $\mu_B$ corresponds to the diffraction profile $D(x_B)$ closest to the diffraction profile $D(x_A)$ and corresponds to the effective atomic number $Z_{Beff}$ closest to the effective atomic number $Z_{Aeff}$. In the alternative embodiment, processor 84 executes 1248, 1250, and 1252 and repeats the method of the alternative embodiment for the remaining pixels of the x-ray image of unknown substance 67. In the alternative embodiment, processor 84 does not generate more than one linear attenuation coefficient corresponding to at least one of the diffraction profile $D(x_B)$ closest to the diffraction profile $D(x_A)$, the effective atomic number $Z_{Beff}$ closest to the effective atomic number $Z_{Aeff}$, and the packing fraction $\eta_B$ closest to the packing fraction $\eta_A$. For example, upon determining that the linear attenuation coefficient $\mu_B$ corresponds to the diffraction profile $D(x_B)$ determined to be closest to the diffraction profile $D(x_A)$ and does not correspond to the effective atomic number $Z_{Ceff}$ determined to be closest to the effective atomic number $Z_{Aeff}$, processor 84 does not output $\mu_B$ and $\mu_C$. The linear attenuation coefficient $\mu_C$ corresponds to the effective atomic number $Z_{Ceff}$.

Technical effects of the herein described systems and methods for reducing an artifact within an image include reducing an artifact within the x-ray image of unknown substance 67. As an example, the artifact is reduced by replacing the CT number $CT_{pixel1}$ with either the CT number $CT_{newpixel1}$ or the CT number $CT_{new1pixel1}$. As another example, the artifact is reduced by replacing the CT number $CT_{pixel2}$ with either the CT number $CT_{newpixel2}$ or the CT number $CT_{new1pixel2}$. Other technical effects include minimizing a false alarm rate in identifying unknown substance 67 by reducing an artifact within the x-ray image representing unknown substance 67. Technical effects also include using the effective atomic number $Z_{Aeff}$ and the packing fraction $\eta_A$ of unknown substance 67 to reduce an artifact within the x-ray image of unknown substance 67.

While the invention has been described in terms of various specific embodiments, those skilled in the art will recognize that the invention can be practiced with modification within the spirit and scope of the claims.

What is claimed is:

1. A method for reducing an artifact within an image of a substance, said method comprising:

generating the image of the substance;
generating at least one of a measured diffraction profile, a measured effective atomic number, and a measured packing fraction of the substance;
determining a pre-stored linear attenuation coefficient corresponding to at least one of a pre-stored diffraction profile, a pre-stored effective atomic number, and a pre-stored packing fraction; and
changing a measured linear attenuation coefficient of a pixel of the image to match the pre-stored linear attenuation coefficient.

2. A method in accordance with claim 1 further comprising:
generating the measured diffraction profile; and
determining a pre-stored diffraction profile that is closest to the measured diffraction profile.

3. A method in accordance with claim 1 further comprising:
generating the measured effective atomic number; and
determining a pre-stored effective atomic number that is closest to the measured effective atomic number of the substance.

4. A method in accordance with claim 1 further comprising:
generating the measured packing fraction; and
determining a pre-stored packing fraction that is closest to the measured packing fraction of the substance.

5. A method in accordance with claim 1 further comprising:
generating the measured diffraction profile;
determining a pre-stored diffraction profile that is closest to the measured diffraction profile; and
determining the pre-stored linear attenuation coefficient corresponding to the pre-stored diffraction profile upon determining the pre-stored diffraction profile closest to the measured diffraction profile.

6. A method in accordance with claim 1 further comprising:
generating the measured effective atomic number;
determining a pre-stored effective atomic number that is closest to the measured effective atomic number of the substance; and
determining the pre-stored linear attenuation coefficient corresponding to the pre-stored effective atomic number upon determining the pre-stored effective atomic number closest to the measured effective atomic number.

7. A method in accordance with claim 1 further comprising:
generating the measured packing fraction;
determining a pre-stored packing fraction that is closest to the measured packing fraction of the substance; and
determining the pre-stored linear attenuation coefficient corresponding to the pre-stored packing fraction upon determining the pre-stored effective atomic number closest to the measured packing fraction.

8. A method in accordance with claim 1 further comprising:
generating the measured diffraction profile;
determining a pre-stored diffraction profile that is closest to the measured diffraction profile;
determining the pre-stored linear attenuation coefficient corresponding to the pre-stored diffraction profile upon determining the pre-stored diffraction profile closest to the measured diffraction profile; and
determining whether the measured linear attenuation coefficient of the pixel is equal to the pre-stored linear attenuation coefficient.

9. A method in accordance with claim 1 further comprising:
generating the measured effective atomic number;
determining a pre-stored effective atomic number that is closest to the measured effective atomic number;
determining the pre-stored linear attenuation coefficient corresponding to the pre-stored effective atomic number upon determining the pre-stored effective atomic number closest to the measured effective atomic number; and
determining whether the measured linear attenuation coefficient of the pixel is equal to the pre-stored linear attenuation coefficient.

10. A method in accordance with claim 1 further comprising:
generating the measured packing fraction;
determining a pre-stored packing fraction that is closest to the measured packing fraction;
determining the pre-stored linear attenuation coefficient corresponding to the pre-stored packing fraction upon determining the pre-stored packing fraction closest to the measured packing fraction; and
determining whether the measured linear attenuation coefficient of the pixel is equal to the pre-stored linear attenuation coefficient.

11. A method in accordance with claim 1 further comprising:
generating the measured diffraction profile;
determining a pre-stored diffraction profile that is closest to the measured diffraction profile;
determining the pre-stored linear attenuation coefficient corresponding to the pre-stored diffraction profile upon determining the pre-stored diffraction profile closest to the measured diffraction profile;
determining whether the measured linear attenuation coefficient of the pixel is equal to the pre-stored linear attenuation coefficient; and
changing the measured linear attenuation coefficient of the pixel to match the pre-stored linear attenuation coefficient upon determining that the pre-stored linear attenuation coefficient is not equal to the measured linear attenuation coefficient of the pixel.

12. A method in accordance with claim 1 further comprising:
generating the measured effective atomic number;
determining a pre-stored effective atomic number that is closest to the measured effective atomic number;
determining the pre-stored linear attenuation coefficient corresponding to the pre-stored effective atomic number upon determining the pre-stored effective atomic number closest to the measured effective atomic number;
determining whether the measured linear attenuation coefficient of the pixel is equal to the pre-stored linear attenuation coefficient; and
changing the measured linear attenuation coefficient of the pixel to match the pre-stored linear attenuation coefficient upon determining that the pre-stored linear attenuation coefficient is not equal to the measured linear attenuation coefficient of the pixel.

13. A method in accordance with claim 1 further comprising:
generating the measured packing fraction;
determining a pre-stored packing fraction that is closest to the measured packing fraction;
determining the pre-stored linear attenuation coefficient corresponding to the pre-stored packing fraction upon determining the pre-stored packing fraction closest to the measured packing fraction;

determining whether the measured linear attenuation coefficient of the pixel is equal to the pre-stored linear attenuation coefficient; and changing the measured linear attenuation coefficient of the pixel to match the pre-stored linear attenuation coefficient upon determining that the pre-stored linear attenuation coefficient is not equal to the measured linear attenuation coefficient of the pixel.

14. A method in accordance with claim 1 further comprising:

generating the measured diffraction profile;

determining the pre-stored diffraction profile that is closest to the measured diffraction profile;

determining the pre-stored linear attenuation coefficient corresponding to the pre-stored diffraction profile upon determining the pre-stored diffraction profile closest to the measured diffraction profile;

determining whether the measured linear attenuation coefficient of the pixel is equal to the pre-stored linear attenuation coefficient;

changing the measured linear attenuation coefficient of the pixel to match the pre-stored linear attenuation coefficient upon determining that the pre-stored linear attenuation coefficient is not equal to the measured linear attenuation coefficient of the pixel; and determining whether the measured linear attenuation coefficient of the pixel is less than zero upon determining that the pre-stored linear attenuation coefficient is equal to the measured linear attenuation coefficient of the pixel.

15. A method in accordance with claim 1 further comprising:

generating the measured diffraction profile;

determining a pre-stored diffraction profile that is closest to the measured diffraction profile;

determining the pre-stored linear attenuation coefficient corresponding to the pre-stored diffraction profile upon determining the pre-stored diffraction profile closest to the measured diffraction profile;

determining whether the measured linear attenuation coefficient of the pixel is equal to the pre-stored linear attenuation coefficient;

changing the measured linear attenuation coefficient of the pixel to match the pre-stored linear attenuation coefficient upon determining that the pre-stored linear attenuation coefficient is not equal to the measured linear attenuation coefficient of the pixel;

determining whether the measured linear attenuation coefficient of the pixel is less than zero upon determining that the pre-stored linear attenuation coefficient is equal to the measured linear attenuation coefficient of the pixel; and replacing the measured linear attenuation coefficient of the pixel with zero upon determining that the measured linear attenuation coefficient of the pixel is less than zero.

16. A processor for reducing an artifact within an image of a substance, said processor configured to:

generate the image of the substance;

generate at least one of a measured diffraction profile, a measured effective atomic number, and a measured packing fraction of the substance;

determine a pre-stored linear attenuation coefficient corresponding to at least one of a pre-stored diffraction profile, a pre-stored effective atomic number, and a pre-stored packing fraction; and change a measured linear attenuation coefficient of a pixel of the image to match the pre-stored linear attenuation coefficient.

17. A processor in accordance with claim 16 further configured to:

generate the measured effective atomic number;

determine a pre-stored effective atomic number that is closest to the measured effective atomic number;

determine a pre-stored linear attenuation coefficient corresponding to the pre-stored effective atomic number upon determining the pre-stored effective atomic number closest to the measured effective atomic number;

determine whether the measured linear attenuation coefficient of the pixel is equal to the pre-stored linear attenuation coefficient;

change the measured linear attenuation coefficient of the pixel to match the pre-stored linear attenuation coefficient upon determining that the pre-stored linear attenuation coefficient is not equal to the measured linear attenuation coefficient of the pixel; and determine whether the measured linear attenuation coefficient of the pixel is less than zero upon determining that the pre-stored linear attenuation coefficient is equal to the measured linear attenuation coefficient of the pixel.

18. A processor in accordance with claim 16 further configured to:

generate the measured effective atomic number;

determine a pre-stored effective atomic number that is closest to the measured effective atomic number;

determine a pre-stored linear attenuation coefficient corresponding to the pre-stored effective atomic number upon determining the pre-stored effective atomic number closest to the measured effective atomic number;

determine whether the measured linear attenuation coefficient of the pixel is equal to the pre-stored linear attenuation coefficient;

change the measured linear attenuation coefficient of the pixel to match the pre-stored linear attenuation coefficient upon determining that the pre-stored linear attenuation coefficient is not equal to the measured linear attenuation coefficient of the pixel;

determine whether the measured linear attenuation coefficient of the pixel is less than zero upon determining that the pre-stored linear attenuation coefficient is equal to the measured linear attenuation coefficient of the pixel; and replace the measured linear attenuation coefficient of the pixel with zero upon determining that the measured linear attenuation coefficient of the pixel is less than zero.

19. An imaging system for reducing an artifact within an image of a substance, said imaging system comprising:

an energy source configured to generate energy;

a scatter detector configured to detect a portion of the energy upon passage of the energy through the substance; and a processor configured to:

generate the image of the substance;

generate at least one of a measured diffraction profile, a measured effective atomic number, and a measured packing fraction of the substance;

determine a pre-stored linear attenuation coefficient corresponding to at least one of a pre-stored diffraction profile, a are-stored effective atomic number, and a pre-stored packing fraction; and change a measured linear attenuation coefficient of a pixel of the image to match the pre-stored linear attenuation coefficient.

20. An imaging system in accordance with claim 19, wherein said processor further configured to:

generate the measured packing fraction;

determine a pre-stored packing fraction that is closest to the measured packing fraction;

determine a pre-stored linear attenuation coefficient corresponding to the pre-stored packing fraction upon determining the pre-stored packing fraction closest to the measured packing fraction;

determine whether the measured linear attenuation coefficient of the pixel is equal to the pre-stored linear attenuation coefficient;

change the measured linear attenuation coefficient of the pixel to match the pre-stored linear attenuation coefficient upon determining that the pre-stored linear attenuation coefficient is not equal to the measured linear attenuation coefficient of the pixel;

determine whether the measured linear attenuation coefficient of the pixel is less than zero upon determining that the pre-stored linear attenuation coefficient is equal to the measured linear attenuation coefficient of the pixel; and replace the measured linear attenuation coefficient of the pixel with zero upon determining that the measured linear attenuation coefficient of the pixel is less than zero.

\* \* \* \* \*